(12) United States Patent
McKelvie et al.

(10) Patent No.: US 10,049,036 B2
(45) Date of Patent: *Aug. 14, 2018

(54) RELIABLE DISTRIBUTED MESSAGING USING NON-VOLATILE SYSTEM MEMORY

(71) Applicant: Amazon Technologies, Inc., Seattle, WA (US)

(72) Inventors: Samuel James McKelvie, Seattle, WA (US); Anurag Windlass Gupta, Atherton, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/681,394

(22) Filed: Aug. 20, 2017

(65) Prior Publication Data

US 2017/0371778 A1 Dec. 28, 2017

Related U.S. Application Data

(63) Continuation of application No. 14/070,362, filed on Nov. 1, 2013, now Pat. No. 9,740,606.

(51) Int. Cl.
- *G06F 12/00* (2006.01)
- *G06F 12/02* (2006.01)
- *G06F 11/14* (2006.01)
- *G06F 3/06* (2006.01)

(52) U.S. Cl.
CPC ........ *G06F 12/0238* (2013.01); *G06F 3/0607* (2013.01); *G06F 3/0655* (2013.01); *G06F 11/1471* (2013.01)

(58) Field of Classification Search
None
See application file for complete search history.

(56) References Cited

U.S. PATENT DOCUMENTS

| | | | |
|---|---|---|---|
| 6,567,889 B1 | 5/2003 | DeKoning et al. | |
| 7,730,153 B1 | 6/2010 | Gole et al. | |
| 7,809,778 B2 | 10/2010 | Mitaru | |
| 8,046,548 B1 | 10/2011 | Chatterjee et al. | |

(Continued)

FOREIGN PATENT DOCUMENTS

EP 1277115 1/2003

OTHER PUBLICATIONS

U.S. Appl. No. 14/070,359, filed Nov. 1, Samuel James Mckelvie.
(Continued)

*Primary Examiner* — Prasith Thammavong
*Assistant Examiner* — Jason W Blust
(74) *Attorney, Agent, or Firm* — Robert C. Kowert; Meyertons, Hood, Kivlin, Kowert & Goetzel, P.C.

(57) ABSTRACT

Methods and apparatus for reliable distributed messaging are described. A computer system includes a system memory coupled to one or more processors. The system memory comprises at least a non-volatile portion. A particular location within the non-volatile portion is designated as a target location to which a sender module participating in a communication protocol is granted write permission. A receiver module participating in the communication protocol, subsequent to a failure event that results in a loss of data stored in a volatile portion of the system memory, reads a data item written by the sender program at the target location prior to the failure event. The receiver module performs an operation based on contents of the data item.

20 Claims, 17 Drawing Sheets

(56) References Cited

U.S. PATENT DOCUMENTS

| | | | |
|---|---|---|---|
| 8,176,233 | B1 | 5/2012 | Karamcheti |
| 8,397,032 | B2 | 3/2013 | Elnozahy |
| 8,745,314 | B1 | 6/2014 | Karamcheti et al. |
| 9,740,606 | B1 | 8/2017 | McKelvie et al. |
| 2011/0113213 | A1 | 5/2011 | Obr et al. |
| 2012/0004011 | A1 | 1/2012 | Chun |
| 2012/0042139 | A1 | 2/2012 | Coronado et al. |
| 2012/0054447 | A1 | 3/2012 | Swart et al. |
| 2012/0079174 | A1 | 3/2012 | Talagala et al. |
| 2012/0310985 | A1 | 12/2012 | Gale et al. |
| 2012/0310986 | A1 | 12/2012 | Frantz et al. |
| 2012/0310991 | A1 | 12/2012 | Frantz et al. |
| 2012/0317382 | A1 | 12/2012 | Steed |
| 2013/0227201 | A1 | 8/2013 | Talagala et al. |
| 2014/0208047 | A1 | 7/2014 | Vembu et al. |
| 2015/0095582 | A1 | 4/2015 | Assarpour |

OTHER PUBLICATIONS

U.S. Appl. No. 14/070,355, filed Nov. 1, Samuel James Mckelvie.
U.S. Appl. No. 14/070,350, filed Nov. 1, Samuel James Mckelvie.
U.S. Appl. No. 14/070,347, filed Nov. 1, Samuel James Mckelvie.
Adrian Proctor "Non-Volatile Memory: Non Volatile Memory and its use in Enterprise Applications" 2012 whitepaper downloaded from http://www.vikingtechnology.com/sites/default/files/featuredvideos/NVDIMM_Technology.pdf, pp. 1-8.
U.S. Appl. No. 13/872,530, filed Apr. 29, 2013; Samuel James Mckelvie.
Yuan Xie "Emerging NVM Memory Technologies", Penn State Department of Computer Science and Engineering, Downloaded from http://web.engr.oregonstate.edu/~sllu/xie.pdf on Aug. 13, 2013, pp. 1-31.
"NV-DIMM: Fastest Tier in Your Storage Strategy", 2012 Whitepaper, Viking Technology, pp. 1-7.
U.S. Appl. No. 13/967,185, filed Aug. 14, 2013, Anurag Windlass Gupta.
IBM, "Storage Class Memory : Towards a Disruptively Low-Cost Solid-State Non-Volatile Memory", Almaden Research Center; Jan. 2013, pp. 1-27.
GitHub-Gist, "Latency Numbers Every Programmer Should Know", 6 pages.
Technology Lab/ Information Technology, Sean Gallagher, "Memory That Never Forgets: Non-Volatile DIMMS Hit the Market", Apr. 4, 2013; 3 pages.

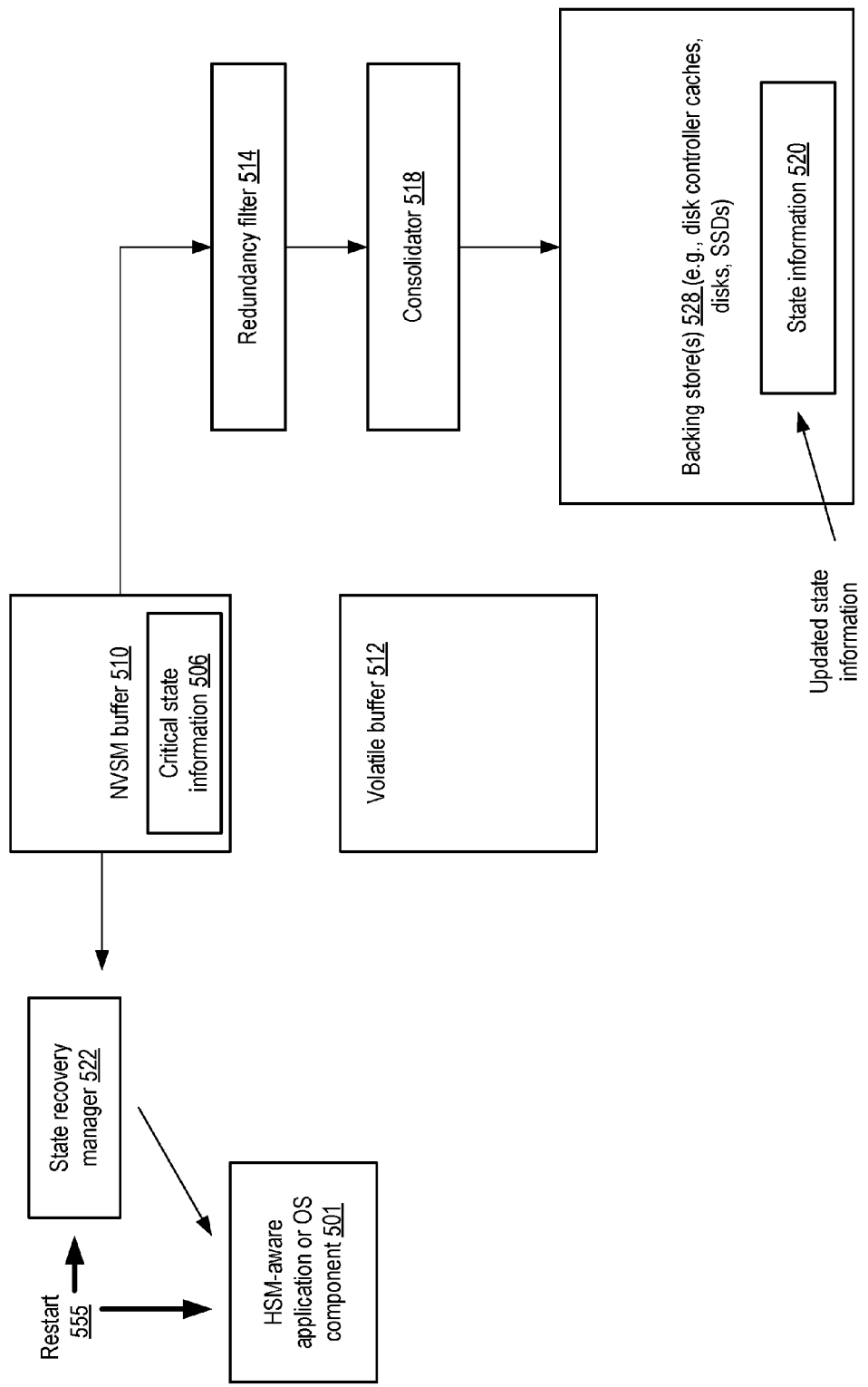

RELIABLE DISTRIBUTED MESSAGING USING NON-VOLATILE SYSTEM MEMORY

This application is a continuation of U.S. patent application Ser. No. 14/070,362, filed Nov. 1, 2013, now U.S. Pat. No. 9,740,606, which is hereby incorporated by reference herein in its entirety.

BACKGROUND

Server-based application programs, often run at data centers run by large "cloud" infrastructure providers, implement a variety of services in common use by millions of people every day, from e-commerce related services to social media applications to e-government portals. The complexity of the application programs, which in turn is at least partially correlated with the extent to which various distributed and decentralized computation models are used, has grown substantially in recent years. Very large amounts of data are handled in these complex application environments, and their data set sizes continue to grow rapidly. The task of managing such applications, including implementing efficient recovery techniques to respond to the failures that are inevitably experienced from time to time in large scale information technology infrastructures, has become increasingly difficult.

In order to increase the overall reliability of application programs, various technologies have been developed over the years to recover more quickly from service interruptions. One way to minimize these service interruptions is to periodically save application and/or operating system state information in a persistent repository, and to read the state information from the repository to recover the state subsequent to restart. However, saving state to (and recovering state from) many types of storage devices may often involve substantial performance overhead. In some cases recovery mechanisms may take so long that the probability of multiple cascading failures (additional failures before recovery from a first failure has been completed) may rise to unacceptable levels.

Recovery from failures that affect distributed applications is notoriously complex, especially when timing-related defects are involved. Such defects are hard to reproduce and debug, especially when the communications between multiple participating processes (e.g., participants in a distributed messaging protocol) are asynchronous in nature, and at least some of the inter-process communication messages may be lost due to the failures. The instrumentation mechanisms typically included in many applications and operating systems, such as logging messages at various levels of detail, may sometimes be insufficient for effective debugging, especially as some of the most relevant logging data may be lost during failure events.

BRIEF DESCRIPTION OF DRAWINGS

FIGS. 5a, 5b and 5c collectively illustrate an example of the use of a non-volatile system memory buffer for critical state information, according to at least some embodiments FIGS. 6a and 6b collectively illustrate examples of the use of non-volatile system memory for saving state information that may be generated as a result of non-idempotent operations, according to at least some embodiments.

Figure 1:
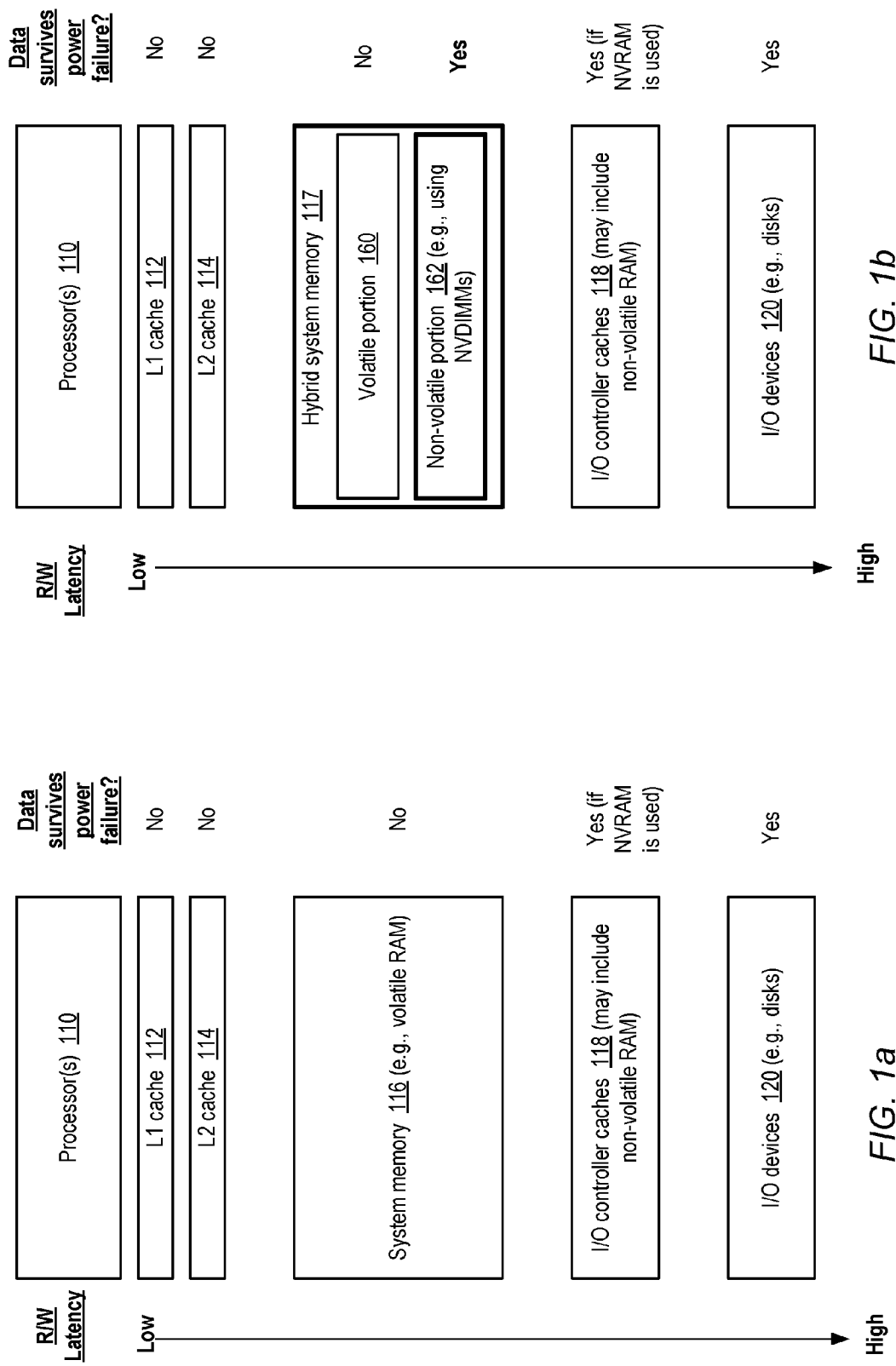
FIGS. 1a and 1b illustrate respective examples of the use of non-volatile memory in alternative memory hierarchies that may be employed in computer systems, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for enhancing application and operating system functionality using non-volatile portions of system memory are described. System memory may also be referred to herein as "main memory" or "internal memory". At least in some implementations, the system memory of a computer may include one or more random access memory (RAM) modules or units that are plugged into the same printed circuit board as the central processing unit (CPU) or CPUs of the computer. In many conventional computer systems, all of the system memory may be volatile, in that the data stored in the system memory is typically lost in the event of power loss or a system crash. In such conventional computer systems, data that is intended to survive a power loss or system crash may have to be written to off-board persistent storage devices (such as disks or various types of disk-based devices such as disk arrays, storage appliances and the like), to which the read and write latencies may be substantially higher than the read and write latencies to system memory. According to at least some embodiments, a hybrid system memory comprising a volatile portion and a non-volatile portion may be implemented for a computer system with one or more processors. Any of a number of technologies, such as various types of non-volatile dual inline memory modules (NV-DIMMs) may be used to implement the non-volatile portion of system memory in different embodiments. Conventional DIMMs may be used for the volatile portion in such embodiments. In at least some implementations, the non-volatile portions of system memory may provide similar read and write latencies as the volatile portions—e.g., the latency differences between the volatile and non-volatile portions of system memory may be dwarfed by the latency differences between the non-volatile memory and off-board memory such as disks. The contents of the non-volatile portions of system memory may survive across power failures and system crashes in various embodiments, enabling a number of unique application-level and kernel-level optimizations and recovery-related techniques described below in further detail.

At least a subset of the programs typically executing on a computer system may each implement a respective state machine. Entities or objects managed by such programs, and in some cases the programs themselves, may move from one state to another based on various types of events or inputs. Examples of such programs include workflows defined for various application-level or administrative tasks: for example, for a content-management application, a given content item may pass through states such as "initialized", "content-creation-in-progress", "created", "queued-for-review", "review-in-progress", "approved-for-publishing", "published", and "withdrawn-from-publication". In some cases the operations that lead to state transitions may be idempotent—e.g., if a triggering operation or event that is intended to leave the state machine in a particular target state happens to be performed more than once (e.g., as part of a "redo" operation after a failure and restart), the state machine remains in the desired target state. For example, in the content management workflow example, if an operation intended to enqueue a content item for review is attempted multiple times and the queue does not support duplicate content item entries, it may still leave the item queued, with few or no negative consequences. However, in other cases, some operations that influence state may be non-idempotent, and may potentially have negative consequences if repeated. For example, consider an application that relies on generating monotonically increasing sequence numbers for participants in a communication protocol. If a record of the generation of a particular sequence number is lost as a result of an error or failure, unexpected sequence numbers may be generated after a restart, which may result in extra work having to be performed by the sender and receiver (e.g., retransmissions and related processing may be required.) In at least some such scenarios, the likelihood of loss of state information may be correlated with the time it takes to save the state information to persistent storage. The time taken to save the state information to persistent storage may thus represent a window of vulnerability that system designers may typically want to minimize.

Accordingly, in an effort to reduce the negative consequences of loss of important state information, a system comprising one or more processors linked to a system memory that includes a non-volatile portion and a volatile portion may be employed in one embodiment. The non-volatile part of system memory may be referred to herein as the NVSM, and the volatile part may be referred to as the VSM. Program instructions stored in the system memory itself may be executed at the one or more processors to manage the allocation and use of both types of the system memory in accordance with various policies in different embodiments.

In at least some implementations, for example due to higher costs of the memory modules used for non-volatile system memory, the amount of NVSM configured at a computer system may be smaller than the amount of VSM configured, or at least smaller than the amount of VSM typically configured in systems with comparable computing capabilities. In such implementations, the NVSM may represent a somewhat scarce resource, and various approaches may be used in an attempt to limit the amount of NVSM space used. In other implementations, enough NVSM may be available that it may not be necessary to consider the NVSM a scarce resource—for example, in some implementations, all of the system memory may comprise non-volatile memory modules.

In one embodiment, the program instructions, when executed at the one or more processors, may identify one or more elements of state information associated with an executable program to be stored at a low-latency persistent data storage site. At least one of the identified elements may be generated as a result of a non-idempotent operation associated with the executable program. Such elements associated with non-idempotent operations may include, for example, internal state information maintained by random number generators to ensure that the generated random numbers meet various mathematical criteria as described below, sequence numbers, transaction identifiers associated with various types of transaction such as e-commerce transactions, records of transitions between defined workflow states for the executable program, and the like. Some applications, such as various security-related or cryptographic applications may rely on a policy of non-reuse (at least within a specified time period) of values such as random strings or random numbers, and such non-reusable values may also be included in the state information that is to be stored at a low-latency persistent data storage site in some embodiments. In some embodiments, an application provider may have to list, e.g., during an audit, the unique data values were generated in accordance with such a non-reuse policy, and saving the values in NVSM (at least until they can be saved at other storage devices) may thus be useful for auditing purposes.

A particular portion of the NVSM may be selected as the low-latency persistent data storage site for the identified elements of state information in at least some embodiments. In one implementation, memory management components of an operating system in use may select addresses from the non-volatile system memory regions in response to various system calls or other API (application programming interface) invocations that indicate a preference for non-volatile memory. Writes or updates of the selected elements of state information, which may be initiated by or accompany the non-idempotent operations, may result in storage of the corresponding values in the NVSM. In some implementations, at least a portion of the selected state information may initially be written to volatile memory, and may be copied to the NVSM in response to any of various triggering events in different embodiments—e.g., upon detecting a corresponding non-idempotent operation, at predetermined time intervals, or in response to an explicit request (e.g., a state checkpointing request) from the program involved in the state transitions or from a different program. If a failure event causes loss of data stored in the volatile portions of system memory, the state information elements that were written to the NVSM may survive the failure, and may be retrieved and used for various recovery operations.

In at least some embodiments, the NVSM may be protected from being overwritten during a reboot/restart of the computer using various isolation techniques. E.g., in one embodiment, as soon as a power failure or similar event is detected, the NVSM (or a subset of the NVSM) may be latched or locked to prevent further writes, and the latch or lock may be maintained until at least some predetermined phase of recovery is completed after restart. During the interval that it is inaccessible for writes, in some implementations, the NVSM may still be available for reads. After the predetermined phase of recovery is completed, the NVSM may once again be made accessible for writes.

In at least one embodiment, portions of the NVSM may be mapped directly into application address space, e.g., using system calls or interfaces similar in functionality to the mmap( ) and related interfaces, or the shmget( ) and related interfaces available in various Unix™-based operating systems. Such memory mapping interfaces may allow the caller to specify, for example, whether non-volatile memory is to be used for the mapping, or volatile memory is to be used. In some embodiments, the memory management components of the operating system may allow objects or memory segments to be moved from the volatile portion of system memory to the non-volatile portion, or vice-versa, e.g., using "make_nonvolatile( )" or "make_volatile( )". Invoking make_volatile( ) on a specified memory object O1 may, for example, lead to a memory manager component implementing the following sequence of operations in one implementation: (a) determine whether O1 is in the NVSM already, and if so, return a pointer to O1 and/or a success return code (b) if O1 is not in the NVSM, copy O1's contents to NVSM and return a handle or pointer to the new location within the NVSM and/or a success return code.

In at least some embodiments, the NVSM may also be used to enhance the integrity of, and speed up the recovery operations associated with, various operating system (OS) components. OS components such as file system managers, logical volume managers, device drivers associated with block-level devices, networking stack components, and the like may all maintain their respective sets of metadata in some embodiments. At least a subset of the metadata may typically have to be analyzed and/or replayed to recover the state of the OS component after a failure. In some embodiments, an OS component may select the specific types of metadata that should be saved in low-latency high-durability storage region. A portion of the NVSM may be designated or allocated for the selected OS component metadata. When the metadata changes (e.g., in response to object creation or deletion, or permission changes), the changed elements (or condensed representations of the changes) may be stored to the selected portion of the NVSM. After a failure event, the saved metadata elements may be quickly read in from the NVSM to restore the state of the OS component. In some embodiments, in addition to metadata, at least some user-generated data may also be stored in the NVSM by the OS components. For example, in one embodiment, a per-file write cache (or a write cache for multiple files) may be maintained by a file system manager, and the contents of at least a selected set of recent writes to a file may be stored in the NVSM. Similarly, a block-level device driver may implement write caches in some embodiments, and contents of at least some of the writes directed to a given block device may be stored in the NVSM.

In many of the embodiments in which OS components store their metadata and/or data in the NVSM, only a recently-modified subset of modified metadata or data (e.g., metadata or data generated within the most recent five-minute interval) may be stored in the NVSM. A backing store on disk or some other storage that has higher latency (and/or lower cost) may be established as a longer-duration and larger permanent repository for the metadata and data. When a metadata element is written to the NVSM, in at least some embodiments a corresponding write to the backing store may also be scheduled. In some such embodiments, when an acknowledgement that the element has been written to the backing store is received, the part of the NVSM that was used to store the element may be freed. In at least some embodiments, the writes to the backing store may be batched, e.g., instead of being implemented for each element separately. For example, in one embodiment, a set of updates to the NVSM that occurred over some time period (such as 10 milliseconds), may be considered as a group for the purpose of writing to the backing store. The collected set of metadata may be analyzed for redundancy and/or relevance, e.g., to reduce the amount of data that is actually transmitted to the backing store, some metadata elements that have been superseded, or are deemed unimportant or unnecessary, may be discarded. In some embodiments, the metadata may be compressed and/or otherwise consolidated before being written to the backing store, so that, for example, N different metadata elements are written to the backing store as part of a single write operation.

According to at least some embodiments, NVSM may be used to implement communication protocols, such as various types of store-and-forward protocols or message queueing protocols. In one embodiment, a protocol that relies on the use of shared memory may be implemented, according to which a sender (the source of one or more messages formatted in accordance with the protocol) is granted write permission to a location at a system memory of the receiver or destination. Message transfers are implemented by the sender writing to a specified address at the receiver's memory, and the receiver reading the data from that address. According to at least some protocols, the sender may receive an acknowledgement of the completion of the write, while the receiver may not necessarily read the message until some later time; thus, the writing and the reading of the system memory location may be asynchronous, and potentially separated by a substantial time interval. In at least some embodiments, a target location at which the sender is to write the message contents may be selected from the NVSM (e.g., if the receiver comprises a process running at an NVSM-equipped server). In such embodiments, even if a failure occurs that causes loss of data stored in the volatile portion of system memory of the receiver prior to the receiver reading the stored message, the message contents may be retrieved by the receiver subsequent to the failure. A chain of memory locations at the NVSMs of various participants in a store and forward protocol may be established, in which each sender is granted write access to the NVSM of the next receiver, so that messages may be propagated in a highly efficient and durable manner.

In at least one embodiment, enhanced logging techniques may be implemented using non-volatile system memory. Log messages or records may typically be generated by various programs, including for example operating system logging components (e.g., processes implementing the syslog standard), as well as by various user-mode application logging and tracing mechanisms. Such log records are often a primary source of debugging information. Unfortunately, in the event of certain types of failures such as those caused by power loss or system crashes, some of the most recent (and hence most relevant, from a debugging point of view) log records may often be lost. In some embodiments, in order to retain as much logging information as possible across power losses and other similar failures, a portion of NVSM may be selected as a log staging area or a log persistence area. A portion of a different persistent store (such as a disk device) may be designated as the backing store for the log messages in at least some such embodiments. Various log messages may be generated in response to detected events, and at least a subset may be written, at least initially, to the log staging area in non-volatile system memory in some embodiments. Subsequent to a failure, the log records written to the staging area in NVSM may be retrievable for debugging analysis, even if they had not been written to the backing store prior to the failure. In some embodiments, depending for example on the types of logging information being collected, the amount of non-volatile system memory available for the log staging area and/or on the debugging time windows for which log records are expected to be useful for post-failure analysis, a backing store need not be designated at all. Instead, the log records may only be written to the NVSM area in some such embodiments. In at least some implementations, the region of the NVSM that is used for log records may be configured as a circular buffer, with older log records being replaced by newer ones over time.

Any of a number of different criteria may be used to decide which subsets of log records are to be written to the NVSM in different embodiments. For example, in some embodiments each log record may have an associated log level, so that, for example, by changing a configurable parameter, different amounts of logged information may be emitted by an application or OS component. In such a scenario, if an administrator changes the log level of an application A from "ERROR" to "DEBUG", more log records may typically be generated that would have been generated at the "ERROR" level. In some such embodiments, the subset of log records that are written to the NVSM may be selectable (often dynamically, e.g., while the application continues to run) using log levels. In some embodiments in which log records from a variety of components (e.g., different operating system modules or different application modules) are entered into a single log, a decision as to whether a given log record is to be written to the NVSM or not may be made based at least in part on the record's source (e.g., on which operating system module or application module emitted the log record). In one embodiment, metrics regarding current operating conditions may be used to decide whether a particular log record should be written to an NVSM—e.g., if an operating system component determines that the ambient temperature has risen by ten degrees over a given time period, some set of log records may be directed to the NVSM. In some embodiments, explicit requests may be submitted to direct log records to the NVSM—e.g., a monitoring program may decide when various log records of a monitored program are to be saved in the NVSM instead of being written directly to a backing store, and may submit the corresponding requests to a logging subsystem.

It is noted that in some implementations, the entire system memory of a given system may comprise non-volatile memory modules. In at least some implementations, the amount of non-volatile system memory may be changed as needed, e.g., by unplugging/uninstalling conventional DIMMs and replacing them with NV-DIMMs.

Memory Hierarchy Examples

FIGS. 1a and 1b illustrate respective examples of the use of non-volatile memory in alternative memory hierarchies that may be employed in computer systems, according to at least some embodiments. FIG. 1a illustrates a conventional memory hierarchy, in which the system or main memory 116 consists entirely of volatile memory modules. In FIG. 1b, in contrast, the system memory includes a non-volatile portion as well as a volatile portion, and is therefore referred to as a hybrid system memory 117. It is noted that a simplified overview of the memory hierarchies is provided in FIGS. 1a and 1b for ease of explanation, and that in different implementations the memory hierarchies may include additional layers, or may exclude some of the layers shown in FIGS. 1a and 1b. It is also noted that while some values of possible read and write latencies are provided below, such values are provided merely as examples, and the actual latencies achieved in different embodiments may differ substantially from the example values.

The read/write latencies (from the perspective of the processors 110) of the various elements of the memory hierarchies increases from the top to the bottom in the figures, as indicated by the respective arrows labeled "R/W Latency" in FIGS. 1a and 1b. Whether data stored in a particular element of the hierarchy survive power failure events (i.e., whether contents of a memory location written before a power failure can be read upon restart after the failure) is indicated for the various hierarchy levels in the respective columns labeled "Data survives power failure?". It is noted that while power failure is used as the example of a failure event that may result in data loss in FIGS. 1a and 1b, other types of failure events, such as operating system crashes or application exits due to various software defects, may also lead to loss of data in various implementations.

In both memory hierarchies illustrated, L1 (level 1) and L2 (level 2) caches, labeled 112 and 114 respectively, represent the fastest (lowest latency) memory elements. Depending on the semiconductor technology being used, in some embodiments, for example, the latencies to the L1 and L2 caches from the processors 110A or 110B may be on the order of between a fraction of a nanosecond (e.g., for L1 cache references) and a few nanoseconds (for L2 cache references). However, none of the data stored in the L1 and L2 caches may survive a power failure.

System memory represents the next fastest layer of the illustrated hierarchies. In some embodiments, for example, the latencies to system memory may be on the order of a hundred nanoseconds, depending on the underlying semiconductor technologies being used and the amount of data involved. In at least some embodiments, the read latencies for the non-volatile portion 162 of a hybrid system memory 117 may be equal to, or very close to, the read latencies for the volatile portion 160 of the hybrid system memory, or to the read latencies for the conventional system memory 116. In some implementations, the write latencies to system memory may be approximately equal to the read latencies. In other embodiments, the write latencies may differ from the read latencies for either the volatile portion 160, the non-volatile portion 162, or both the volatile and non-volatile portions.

According to at least some embodiments, non-volatile memory components may be used to implement various types of caches 118 at I/O controllers, such as disk controllers, RAID (redundant arrays of inexpensive disk) controllers, storage appliance controllers and the like. In order to access such controller caches, in at least some implementations data may be transferred from the system memory, which may be plugged into the same "motherboard" as the processors 110, outside the motherboard to a different printed circuit board over one or more I/O busses. Accordingly, the latency to such I/O controller caches may typically be substantially higher than the latency to system memory, e.g., on the order of a millisecond in some implementations. In the memory hierarchy shown in FIG. 1a, the I/O controller cache 118 represents the nearest (lowest-latency) location at which data can be stored to survive power failure events. In contrast, in the memory hierarchy shown in FIG. 1b, the non-volatile portion 162 of the system memory, which may have a much lower latency than the I/O controller cache, represents the lowest-latency location at which data can be saved to survive power failure events. It is noted that for at least some I/O devices in some embodiments, the corresponding I/O controllers need not implement caches that use non-volatile memory (or may not implement caches at all).

In both the memory hierarchies illustrated in FIG. 1a and FIG. 1b, I/O devices 120 such as disk-based devices are shown as the highest-latency storage locations. In some embodiments, depending for example on the size and rotational speeds of the disks being used, access latencies to the I/O devices (which may include disk head seek time, for example) may be on the order of tens of milliseconds. In some embodiments, for example in large provider networks in which commodity hardware is typically used for hosting many different kinds of applications inexpensively, I/O controller caches may be very small (or may not even be implemented as mentioned above). As a result, in such environments, the I/O devices 120 may represent the lowest-latency persistent storage available unless non-volatile system memory is implemented. The costs of writing and reading critical data to and from disk-based I/O devices (or to I/O controller caches) may significantly increase the time required for recovery operations which may, for example, require reading saved metadata for various applications and system components, and may also expand the time windows of vulnerability for various types of errors or race conditions. In some embodiments, solid-state drives or SSDs may be used, which may provide faster latencies than traditional electromechanical disks, but may typically still have higher latencies than system memory.

Any combinations of various types of devices may be used to implement the volatile and/or non-volatile portions of system memory 117 in different embodiments. For example, dynamic random access memory (DRAM), static random access memory (SRAM), in addition to other random access memory technologies, including, but not limited to dual in-line memory module (DIMM), synchronous dynamic random access memory (SDRAM), double data rate synchronous random access memory (DDR-SDRAM), etc. may be used at least for the volatile portion. For the non-volatile portion of system memory, in some embodiments flash-based memory devices, including for example NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, racetrack memory, Ferroelectric RAM, magnetoresistive RAM (MRAM), or any of various types of phase change memory (PCM) may be used at least for the non-volatile portion of system memory 162. In some embodiments, hybrid memory modules that each incorporate both volatile and non-volatile memory may be used. As a variety of volatile memory technologies and non-volatile memory technologies are well-known to those of ordinary skill in the art, the above examples are not intended to be limiting.

According to at least some embodiments, a controller associated with system memory may be responsible for enabling write access to at least a portion of the non-volatile system memory (NVSM). In one implementation, such a controller may comprise one or more ASICs (application-specific integrated circuits). In one such embodiment, the controller may be programmed to prevent write access to the NVSM (or selected sub-portions thereof) until a predetermined phase of recovery (e.g., of the operating system as a whole, or of specific operating system components or applications) is completed after a restart of the system. Using such a controller, in at least some embodiments, boot-related processes of the operating system may be prevented from overwriting state information that may have been stored in the NVSM prior to a crash or power failure to assist in subsequent recovery.

Non-Volatile System Memory (NVSM) Management Components and Pathways

Figure 2:
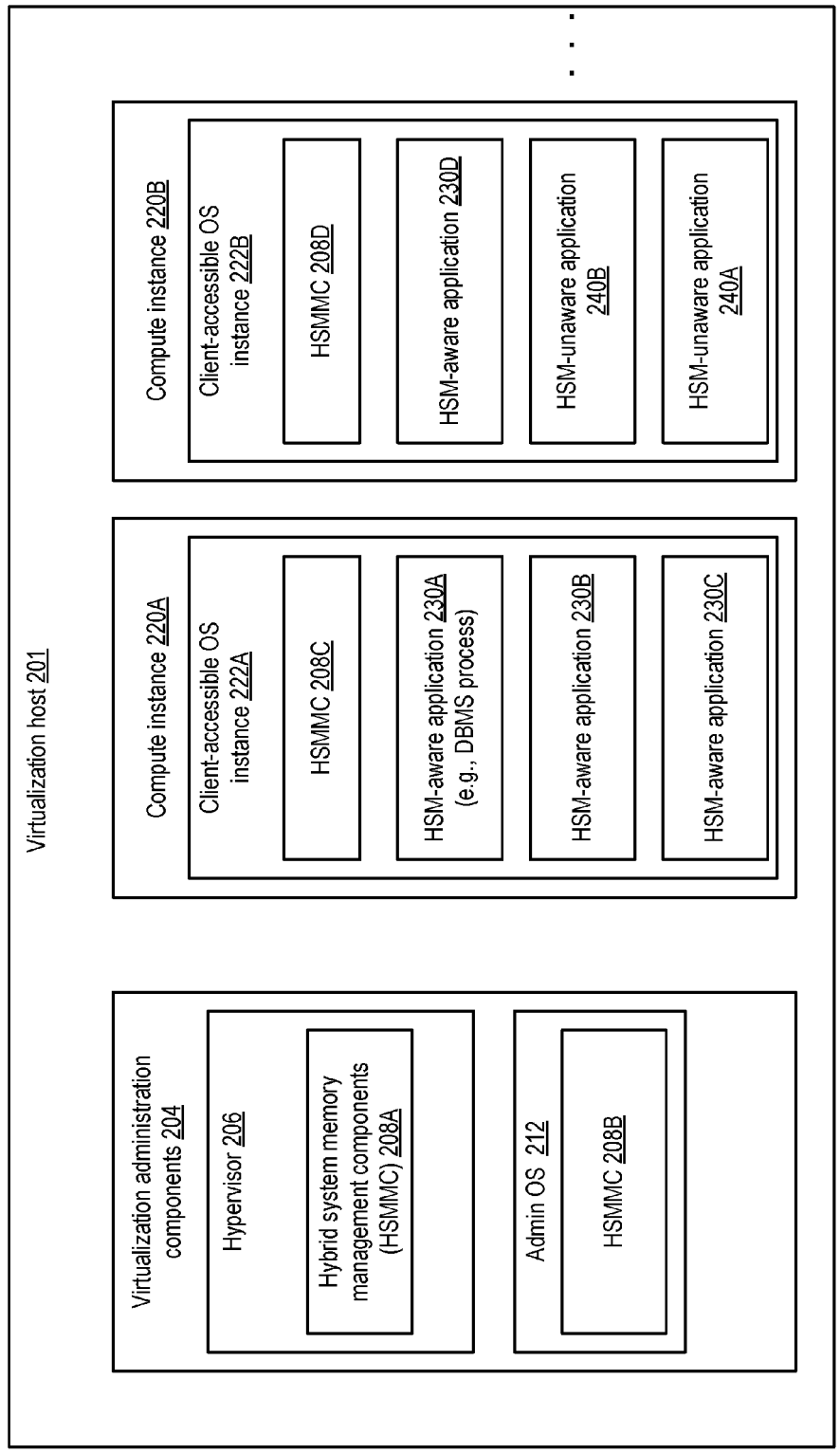
FIG. 2 illustrates example components of a virtualization host that may be configured to manage and utilize hybrid system memory, according to at least some embodiments.

In various embodiments, NVSM may be utilized at different types of computer hosts, including hosts that run operating systems natively, and hosts that run virtualization software to support multiple "compute instances" (virtual machines). A computer system (such as a rack-based server) configured to implement a plurality of compute instances may be referred to as a virtualization host. Many large providers of network-accessible or "cloud-based" services often configure thousands of such virtualization hosts at various data centers around the world. Using compute instances, a number of different higher-level services may also be provided in some cases, such as various types of database services, parallel computation services, load balancing services, workflow management services, and the like. At least some of the types of applications and services typically run using compute instances may be able to benefit from NVSM functionality. FIG. 2 illustrates example components of a virtualization host that may be configured to manage and utilize hybrid system memory, according to at least some embodiments.

As shown, virtualization host 201 may include a set of virtualization administration components 204, and one or more compute instances 220, such as compute instance 220A and 220B in the depicted embodiment. Virtualization administration components 204 may include, for example, a hypervisor 206 and/or an administrative operating system 212 (i.e., an instance of an operating system that is typically not accessible to clients on whose behalf the compute instances are set up, but may be used for various administrative tasks). Each compute instance 220 may comprise its own instance of an operating system, such as client-accessible OS instances 222A and 222B at compute instances 220A and 220B respectively. A number of client applications or application components may be run at each instance.

Virtualization host 201 may include a hybrid system memory (HSM) 117 (not explicitly shown in FIG. 2) comprising both a non-volatile portion and a volatile portion in the depicted embodiment. A number of memory management administrative components at such a host may collectively manage the hybrid system memory in some embodiments. As shown, such hybrid system memory management components (HSMMCs) 208 may exist within the hypervisor 206 (HSMMC 208A), the administrative operating system (HSMMC 208B), and/or also within the client-accessible OS instances 222A (HSMMC 208C) and 222B (HSMMC 208D) in at least some embodiments. Each of the HSMMCs 208 in the embodiment of FIG. 2 may be capable of, for example, determining which portions of the system memory accessible to them are non-volatile and which are volatile, and of performing various memory-related operations on other types of memory, such as allocating, writing, reading, copying or moving objects within the non-volatile or volatile portions, and/or mapping portions of the NVSM or VSM into application address space. Different HSMMCs may have different responsibilities with respect to managing the NVSM in at least some embodiments—e.g., the hypervisor's HSMMC 208A may be responsible for determining how much of the NVSM is to made accessible from each of the compute instances 220, while the instance HSMMCs such as 208C and 208D may be responsible for allocating and managing space within the respective portions of the NVSM available to their instances.

The applications running at the various instances may include some that are "aware" of the hybrid system memory (e.g., HSM-aware applications 230A, 230B, 230C and 230D), and some that are "unaware" of the hybrid system memory (e.g., HSM-unaware applications 240A and 240B). HSM-aware applications 230 may include, for example, source code that explicitly indicates the kind of system memory (volatile versus non-volatile) preferred or desired for various memory objects, while HSM-unaware applications 240 may not provide indications of system memory preferences. A database process implemented as part of a network-accessible database service may, for example, be HSM-aware (e.g., HSM-aware application 230A may comprise a database process) in one embodiment, and may issue memory allocation requests for non-volatile memory for certain key database metadata objects. Various types of programmatic interfaces (such as memory-related system call interfaces) may be available for use by HSM-aware applications in at least some embodiments, as discussed below in reference to FIG. 3 and FIG. 4.

It is noted that in various embodiments, both HSM-unaware applications and HSM-aware applications may be able to benefit from the presence of non-volatile system memory at the host. HSM-aware applications may, as indicated above, provide indications of the kind of system memory preferred for various data structures used, and such indications may be taken into account by the relevant HSMMCs. In at least some embodiments, various other components of the operation systems (such as client-accessible operating system instances 222A and 222B, as well as administrative operating system 212) may also utilize non-volatile system memory for metadata and/or data for various entities such as files, file systems and the like, which may improve the performance and/or reliability of HSM-unaware applications. Examples and details of the use of non-volatile system memory by various operating system components in different embodiments are provided below, e.g., in conjunction with the descriptions of FIG. 7 and FIG. 12. It is noted that HSMMCs similar to those illustrated in FIG. 2 may be implemented at hosts that do not support virtualization in at least some embodiments, and that both HSM-aware and HSM-unaware applications may benefit from the availability of non-volatile system memory on such hosts as well.

Figure 3:
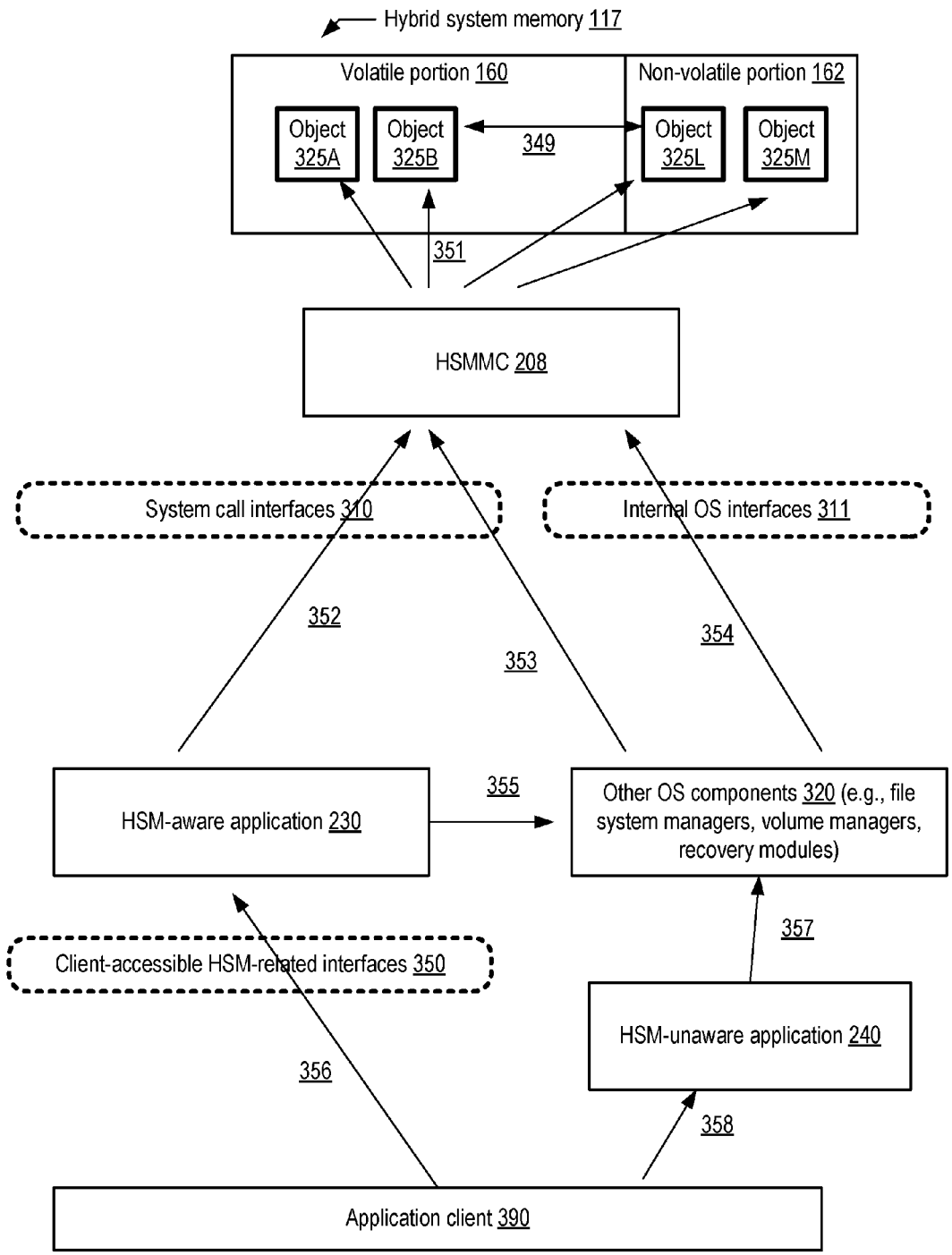
FIG. 3 illustrates example request pathways that may result in a use of non-volatile system memory, according to at least some embodiments.

FIG. 3 illustrates example request pathways that may result in a use of non-volatile system memory, according to at least some embodiments. As shown, an HSMMC 208 may be configured to perform various types of memory management operations on a hybrid system memory 117 comprising volatile portion 160 and non-volatile portion 162 in the depicted embodiment. For example, the HSMMC 208 may allocate various objects in either portion of the HSM, such as objects 325A, 325B, 325L or 325M, as indicated by arrows 351. The HSMMC 208 may also move or relocate objects from the non-volatile portion 162 to the volatile portion 160, or from the volatile portion to the non-volatile portion, as indicated by arrow 349. At least some of the memory management operations may be performed in response to requests received from other operating systems components, or in response to requests resulting from system call invocations by various applications as described below, some of which may in turn result from work requests submitted by application clients 390.

Application clients 390 may request various types of operations in the depicted embodiment, e.g., from either HSM-aware applications 230 (requests indicated by arrow 356) or HSM-unaware applications 240 (arrow 358). In some embodiments, the client-facing interfaces supported by HSM-aware applications, such as interfaces 350 of application 230, may themselves include HSM-related options. For example, in one database HSM-aware application, a client 390 may be allowed to provide a hint or preference regarding the type of memory to be used for metadata associated with a particular table, e.g., in the form of a parameter of a "create table" command. Such hints or preferences may be taken into account by the HSM-aware database application when obtaining memory for the metadata from the HSMMC 208, for example.

In various embodiments, one or more I/O-related components of the operating system may be HSM-aware, at the hosts or compute instances at which HSM-aware and/or HSM-unaware applications 230 or 240 are executed. For example, file system journal entries may be written to NVSM, per-file write caches or per-block-device write caches may utilize NVSM, and so on. In FIG. 3, arrows 355 and 357 respectively indicate requests from HSM-aware applications and HSM-unaware applications to such operating system components. The requests 355 and 357 (e.g., requests to create files or write to files) may be processed at the operating system components 320, and at least in some cases may result in the use of non-volatile system memory for the affected metadata and/or data. It is noted that with respect to requests 355 and 357, the applications submitting the requests may not indicate any preferences about non-volatile or volatile memory, but the operating system components 320 may nevertheless make decisions in at least some embodiments to use non-volatile memory. In at least some cases, the applications 230 or 240 may not be aware that their requests to the operating system components 320 resulted in the use of non-volatile memory in the depicted embodiment.

According to at least some embodiments, the HSM-aware application 230 and/or the operating system components 320 may utilize system call interfaces 310 to submit memory-related requests to the HSMMC 208. Arrow 352 represents such system call invocations by HSM-aware applications in the depicted embodiment, while arrow 353 represents system call invocations by operating system components 320. In some implementations, a set of memory-related system calls may be extended (such as by adding optional parameter fields) to provide support for non-volatile memory. In other implementations, new system calls may be implemented, e.g., in a new release or version of an operating system or hypervisor, to support operations that indicate caller preferences for one type of system memory over another. Various system calls may be enhanced or added in different embodiments, including for example various flavors or variations of malloc( ), brk( ), mmap( ), alloca( ), malloc_get_state( ), malloc_info( ), malloc_trim( ), malloc_usable_size( ), mallopt( ), shmat( ), shmctl( ), shmget( ), or other memory-related system calls often implemented in Unix™-based operating systems. In addition to, or instead of, using the system call interfaces 310, in at least some implementations the OS components 310 may utilize internal operating system interfaces 311 to request memory-related operations associated with non-volatile system memory, as represented by arrow 354. Internal operating system interfaces 311 may not be available for use by user-mode applications in the depicted embodiment, and may only be available for kernel-mode components. In some embodiments, recovery modules within the operating system, or at the application level, may also utilize at least some of the system call interfaces 310 and/or internal interfaces 311, e.g., to store their own recovery-related metadata at least temporarily. New interfaces may be provided in some embodiments for moving objects between non-volatile and volatile portions of system memory, e.g., for elevating or lowering the durability level for a specified memory. For example, a make_nonvolatile( ) interface may enable the caller to request that an object be moved to nonvolatile memory, and a make_volatile( ) interface may enable the caller to request that an object be moved to volatile memory in one such embodiment. Various other system calls and/or interfaces may also be implemented for operations related to the use of non-volatile system memory in different embodiments. It is noted that at least in some embodiments, a best-effort approach towards providing non-volatile memory may be implemented by an HSMMCs—e.g., when an application or OS component requests non-volatile memory, the HSMMC may instead provide volatile memory (and an appropriate result code) if sufficient space is available in the VSM but not in the NVSM.

Figure 4:
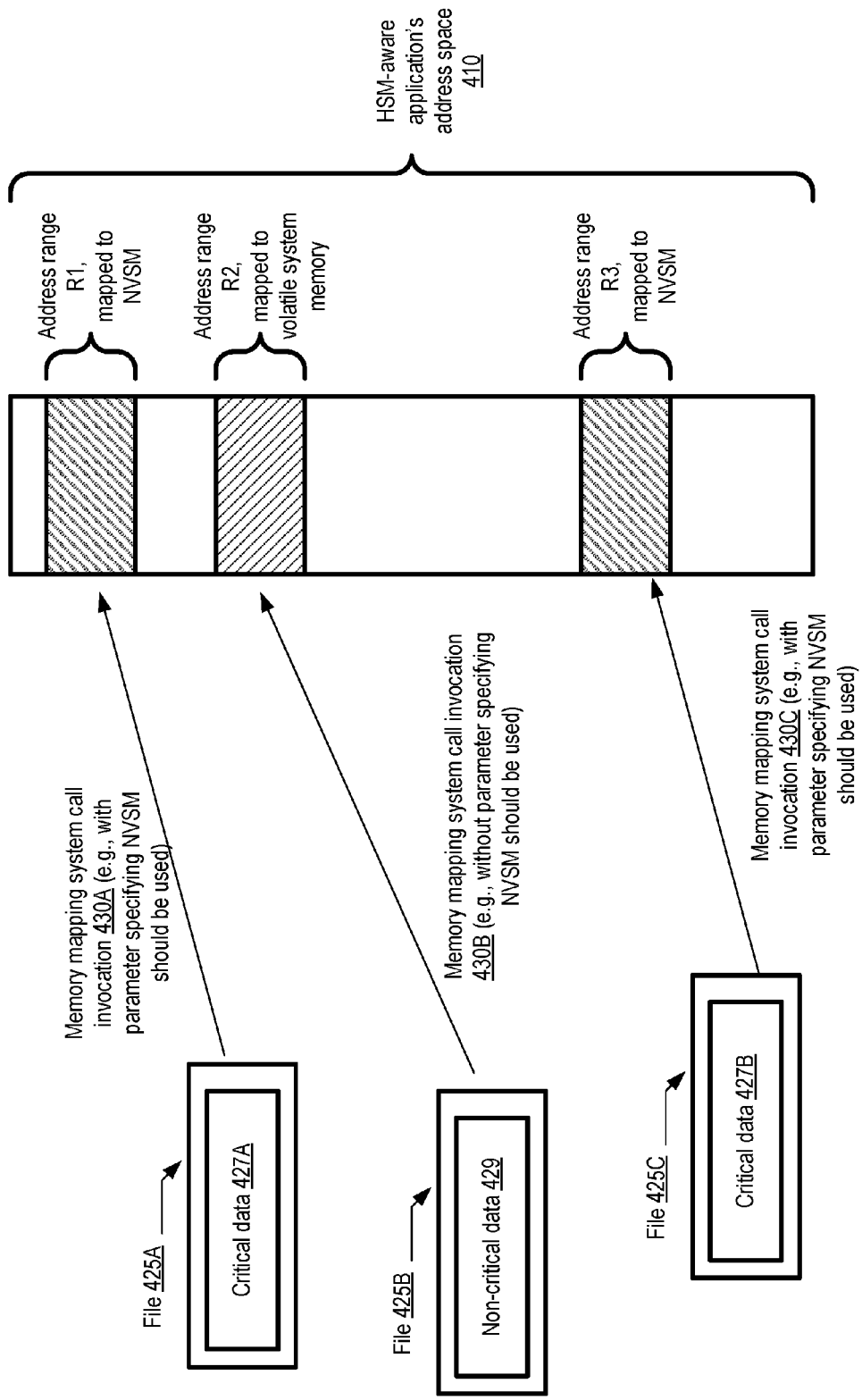
FIG. 4 illustrates an example of a use of a memory mapping technique for application data for which high durability is desired, according to at least some embodiments.

In some embodiments, operations that allow application-level code to access file and/or device data that has been mapped to non-volatile memory may be supported. FIG. 4 illustrates an example of a use of a memory mapping technique for application data for which high durability is desired, according to at least some embodiments. As shown, various portions of an HSM-aware application's address space 410 may be used for mapping files 425, such as files 425A, 425B and 425C. Some files, such as 425A and 425C, that comprise critical application data 427A and 427B respectively, to which access may be required to rapidly restore application state may be mapped to non-volatile system memory (e.g., ranges R1 and R3 of address space 410 may correspond to NVSM). Other files such as file 425B, that contain less critical data 429, may be mapped to volatile system memory (e.g., range R2 of address space 410). It is noted that in addition to being used for mapping files to application address space, in various embodiments other operating system devices may be mapped to NVSM, and anonymous memory mapping (mapping an area of the application address space that is not backed by any file or device to NVSM) may also be supported in at least some embodiments.

Just as in the case of memory mapped I/O in general, the overhead of copying data between user space and kernel space buffers may be reduced (relative to unmapped file read and write operations, for example) using memory mappings to non-volatile system memory. The need for operations such as lseek( ) to access different offsets within a file may also be eliminated when memory-mapped I/O is used. In addition, concurrent shared access to data objects may also be facilitated using memory mappings in at least some embodiments. In one implementation, a "NON_VOLATILE" flag may be added to various memory mapping system calls (such as variants of mmap( )) to indicate that the requested file (or other device) be mapped to non-volatile memory, as indicated by arrows 430A and 430C. If the NON_VOLATILE flag or its equivalent is not used (as in the case of system call invocation 430B), volatile system memory may be mapped instead. In other embodiments, special system calls or other programmatic interfaces may be designed for non-volatile memory mapping. Combining high durability for critical state information with the performance advantages of memory mapping may enable rapid recovery after failures for many types of applications in various embodiments. In addition, because writing to memory-mapped regions of the address space may typically be more efficient compared to other forms of I/O, the time taken to save critical state information of the application may be reduced substantially, reducing the lengths of vulnerable periods during which application state may be corrupted due to failures or race conditions.

State Recovery Techniques Using Non-Volatile System Memory

Figure 5A:
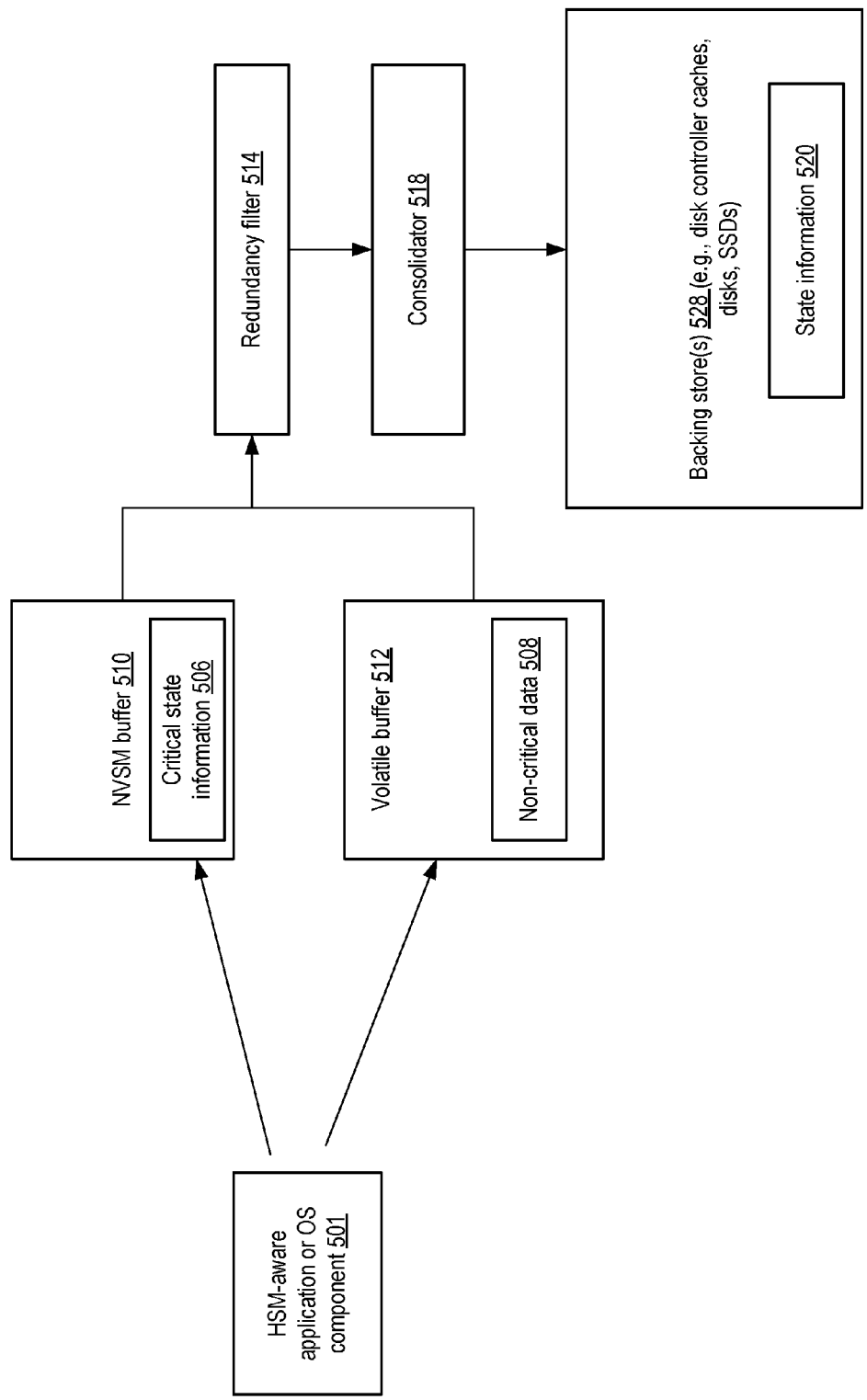
Figure 5B:
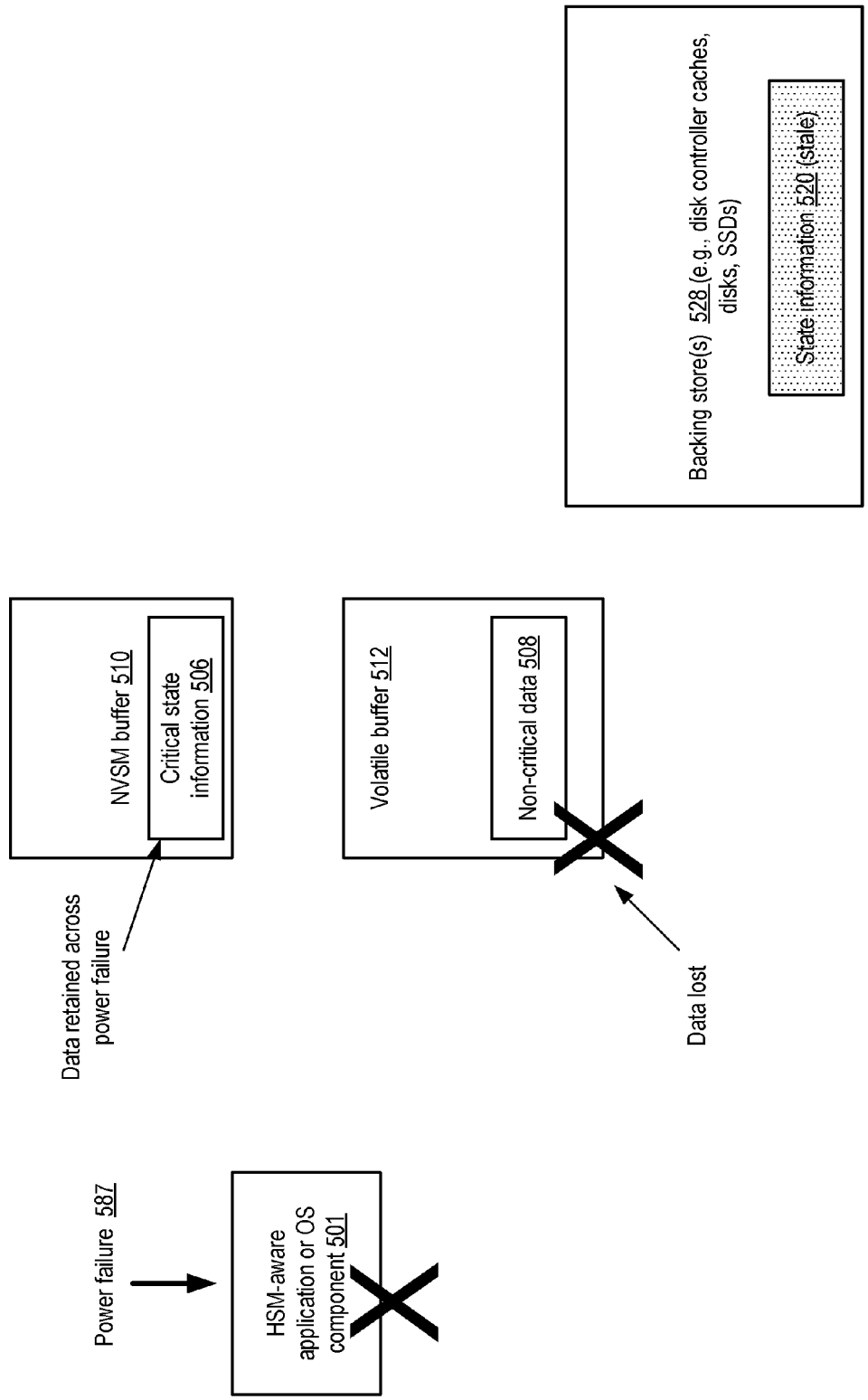

FIGS. 5a, 5b and 5c collectively illustrate an example of the use of a non-volatile system memory buffer for critical state information, according to at least some embodiments. As shown in FIG. 5a, an HSM-aware application or operating system component 501 may establish two types of buffers for various elements of state information in some embodiments. Critical state information, e.g., information that is required to perform at least an initial recovery operation (after which less critical state information may be retrieved, for example) may be stored in buffer 510 in non-volatile system memory. Non-critical application or OS data 508, which may include less important metadata or state information than is stored in buffer 510, may be stored in volatile memory buffer 512. From either or both of the buffers 510 and 512, state information 520 may be written to one or more backing stores 528, e.g., to a disk-based device or to a cache at a controller for a disk-based device. In some implementations, a remote (i.e., network-attached) backing store may be used for some types of state information, in which case the latencies to the backing store may be even higher relative to the latencies to the non-volatile and volatile system memory buffers than if the backing store devices were local.

A number of techniques may be used in different embodiments to decide when and how various portions of the buffered state information are transferred to the backing store. In the depicted embodiments, instead of writing every element of state information individually, writes to the backing store may be batched (submitted in groups). For certain types of state information, for example, the duration during which the state information remains useful may be relatively short. For example, element E1 of state information for an application A1 may sometimes be superseded or rendered redundant or unnecessary by a different element E2 generated within a few milliseconds after E1 was generated. A redundancy filter 514 may be used in the depicted embodiment to decide whether a given element of state information should be written to backing storage, or whether it can be discarded without writing it to the backing storage. Different redundancy filters may be configured for respective application buffers or operating system buffers. In some embodiments and depending on the amount of state information generated or on the rate of generation of state information, redundancy filters may not be used. A consolidator 518 may be configured to combine several elements of state information into a single write operation to the backing store in the depicted embodiment. In some embodiments, various types of compaction techniques may be used to reduce the total amount of state information written to the backing store, e.g., only deltas (changes since the previous write) rather than complete state information entries may be written to the backing store in some cases. Compression algorithms may be used in at least one embodiment, at least on some portions of the state information (such as the non-critical portions). Generally speaking, there may be some delay between the time that a given element of state information is written to a non-volatile system memory buffer 510 or to a volatile system memory buffer 512, and the time that that element is written to the backing store. In some embodiments, state information elements written to the non-volatile system memory buffer may be written to the backing store with a higher priority than elements written to the volatile system memory buffers.

FIG. 5b illustrates effects of a power failure event 587 in the environment illustrated in FIG. 5a. As indicated by the "X" symbols, the application or OS component 501 may terminate or exit as a result of the power failure, and the data stored in the volatile memory buffer 512 may be lost. In addition, the processes or threads responsible for writing data to the backing store may also terminate, rendering the state information 520 out of date or stale within a short time (more out of date than it typically is when the writing processes are active, and are writing the state information relatively rapidly after it is created). However, the critical state information 506 stored in the non-volatile memory may survive the power failure in the depicted embodiment.

FIG. 5c illustrates aspects of the recovery procedures that may be initiated after the power is restored and the system is restarted, according to at least some embodiments. As shown, a state recovery manager 522 may retrieve the critical state information 506 from the buffer 510 in the non-volatile portion of system memory, and restore the state of the application or OS component, e.g., as of a point in time immediately prior to the occurrence of power failure 587. The process(es) to write the state information to the backing store 528 may also be restarted. The kinds of redundancy filtering and compaction techniques described above may be resumed, and the state information at the backing store 528 may be brought up to date, at least with respect to the state information that was written to the non-volatile buffer. Some non-critical data that was written to volatile buffer 512 may be lost in some cases.

State Information Generated by Non-Idempotent Operations

Figure 6A:
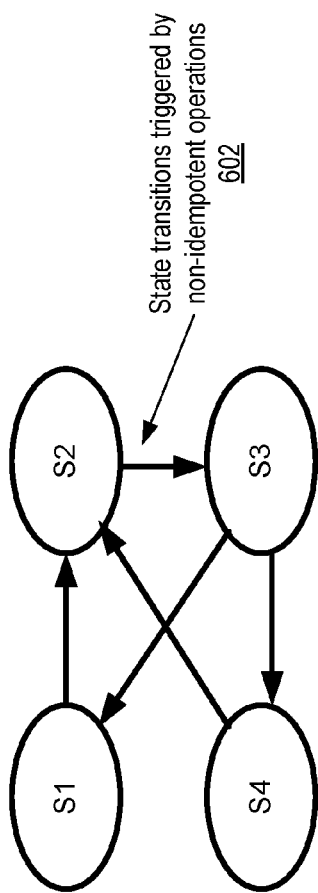
Figure 6B:
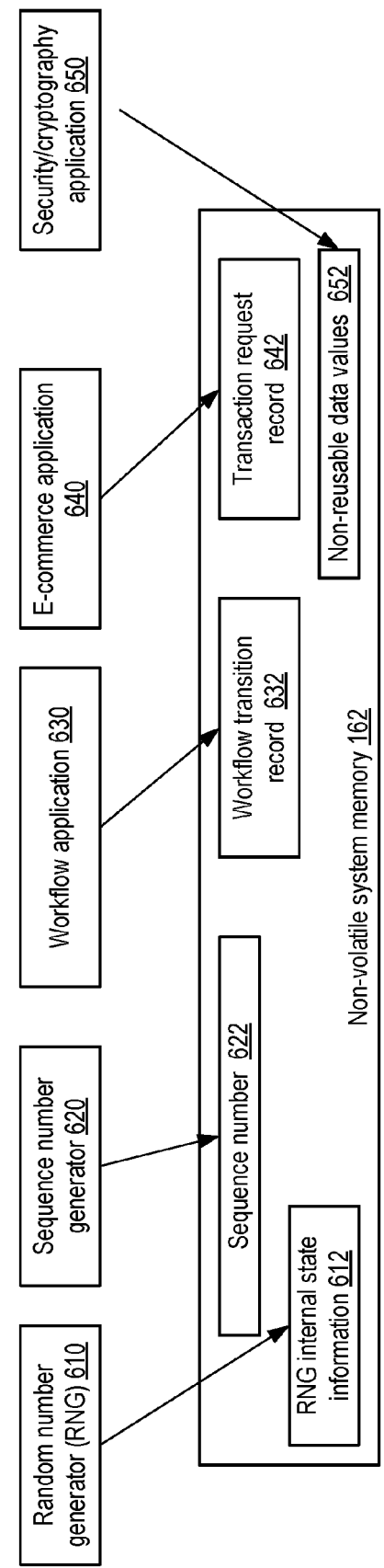

FIGS. 6a and 6b collectively illustrate examples of the use of non-volatile system memory for saving state information that may be generated as a result of non-idempotent operations, according to at least some embodiments. The functionality of many types of applications may be logically representable as a state machine such as that illustrated in FIG. 6a. Four states, S1, S2, S3 and S4 are shown in FIG. 6a for an example application, with at least some of the transitions resulting from, or being triggered by, non-idempotent operations 602. Generally speaking, an idempotent operation in a computing context may be defined as an operation that has no additional effect (or at least no negative side effects) if it is repeated or invoked multiple times. Thus, for example, an invocation of a function or method that simply computes a value based on the input parameters supplied may be considered idempotent. In contrast, if an operation modifies a global or shared data structure, the operation is more likely to have additional or negative effects when invoked repeatedly, and may be considered non-idempotent.

A number of common applications may involve state changes resulting from non-idempotent operations. For such applications, at least some elements of their state information may be stored within non-volatile portions of system memory 162 in various embodiments, as shown in FIG. 6b. Various elements of internal state information 612 of a random number generator (RNG) 610 (or a pseudo-random number generator) may be stored in NVSM in some implementations, for example. If the RNG internal state information is lost, for example if it is stored in volatile system memory and power is lost, in at least some embodiments a nontrivial amount of effort may be required to generate a sufficient amount of entropy for a new sequence of random numbers (e.g., after the system is rebooted). If the RNG internal state information is instead stored in non-volatile system memory, entropy collection after reboot may not be required. In addition, if the RNG internal state information is lost, an RNG 610 may not be able to meet minimum periodicity requirements (e.g., a requirement that after a given random number R1 is generated, at least N other different random numbers should be generated before R1 is again generated), uniformity requirements (e.g., a requirement that the numbers generated should conform as closely as possible to a uniform distribution), or requirements for other desired mathematical properties. In some implementations of random number generators, a deterministic or repeatable sequence of generated "random" values may be desired. In such a scenario, the internal state information used for successive values of the sequence, and/or the generated values themselves, may be stored in the non-volatile portion of system memory in some embodiments. In at least some embodiments, the seeds used for initializing various number sequences may also be stored in non-volatile system memory, e.g., for later auditing or debugging.

Some applications may depend on the use of monotonically increasing sequence numbers. In various embodiments, the sequence numbers 622 may be stored within non-volatile system memory, so that, for example if a power failure occurs or the system crashes, the corresponding sequence number generator 620 may resume where it left off before the failure. Reducing the probability of lost sequence numbers may in turn help reduce the overhead associated with the sequence-number-consuming application's recovery subsequent to the failure.

In at least some embodiments, an application may implement a workflow with a number of different workflow states. Workflow transition records 632 (records of the transitions between workflow states), which may in turn have been triggered by non-idempotent operations associated with a workflow application 630 or a workflow manager, may be stored in the NVSM in such embodiments. It is noted that with respect to workflows, two types of state information may be generated and/or stored in the NVSM in at least some embodiments: information pertaining to the state of the workflow itself (such as records indicating that a particular workflow state has been completed), and information pertaining to the types of operations being managed using the workflow (e.g., transaction identifiers of the kind discussed below may be generated by an application that is participating in a workflow).

A distributed e-commerce application may provide a transaction identifier (intended to be unique to a request for a particular interaction such as a credit card-based payment request) to various entities involved in the transaction. Such a transaction identifier or record may be provided, for example, to a software component used by the payer or buyer in a transaction, so that if there is a payment-related discrepancy, the transaction identifier may be used to refer to the transaction by all the involved parties. Transaction request records 42 (e.g., including a transaction identifier and/or a timestamp) may also be stored in the non-volatile portion of system memory at various components of the e-commerce application 640 in some embodiments.

Various cryptography-related or security-related applications 650 may rely upon non-reusable data values, e.g., for generating cryptographic keys or access codes for secured network domains or secured facilities. In some embodiments, non-reusable data values 652 may also be stored in non-volatile system memory, at least for some short time periods. In the various example applications discussed in the context of FIGS. 6a and 6b, the use of the non-volatile system memory for storing at least selected subsets of state information may help reduce recovery times and overhead subsequent to failures in which data stored at volatile memory would be lost. In case in which the non-volatile portion of system memory is used instead of disk-based storage, the overall performance of the application during normal operating conditions may also be enhanced, in addition to the recovery-related advantages.

Use of Non-Volatile System Memory by Operating System Components

Figure 7:
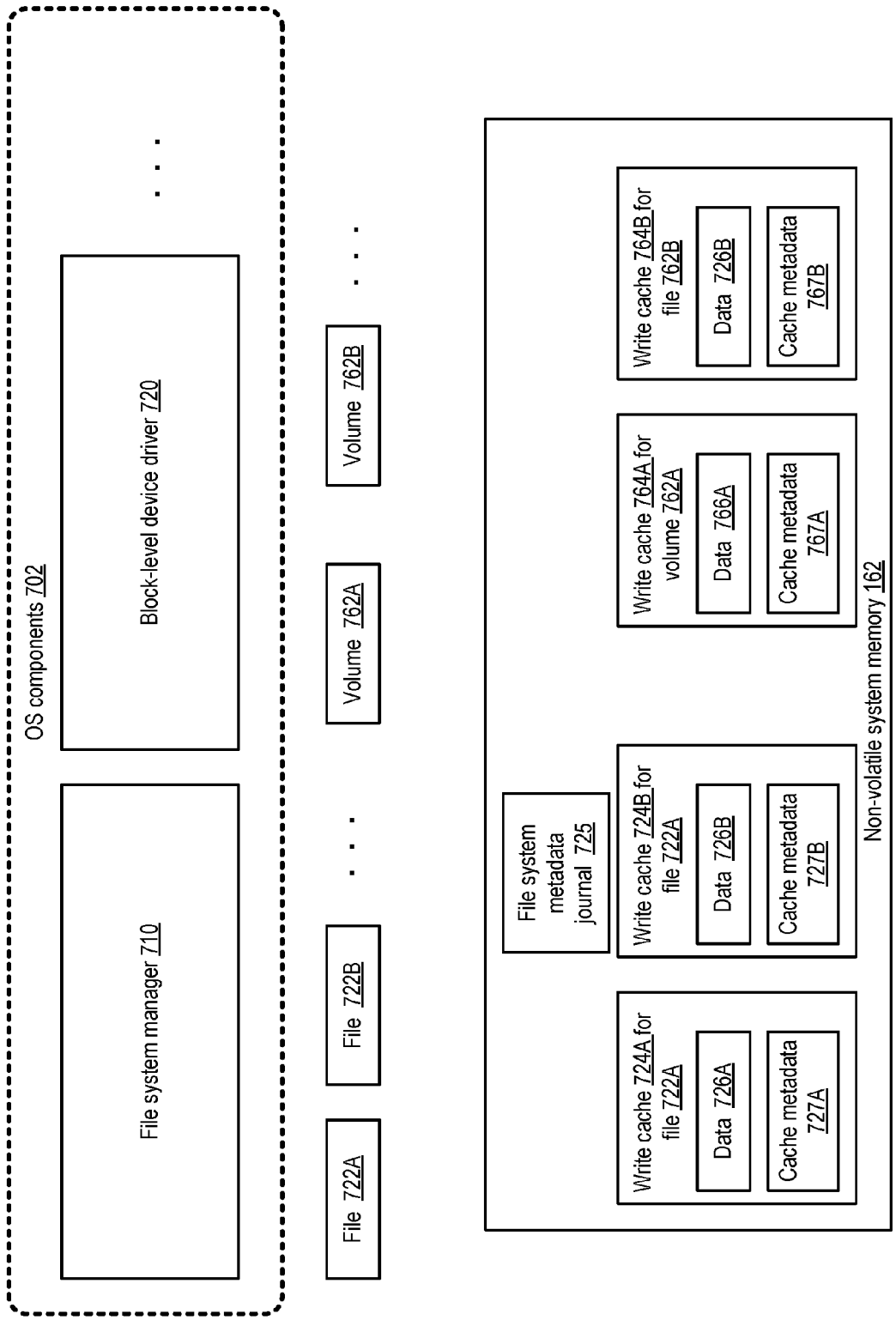
FIG. 7 illustrates examples of the use of non-volatile system memory for enhancing the reliability of I/O-related subsystems of an operating system, according to at least some embodiments.

In some embodiments, as mentioned above, operating systems components may utilize non-volatile system memory for storing metadata important for recovery purposes, and/or for some types of user-generated data. FIG. 7 illustrates examples of the use of non-volatile system memory for enhancing the reliability of I/O-related subsystems of an operating system, according to at least some embodiments. Two examples of I/O-related operating system components 702 are shown: a file system manager 710 and a block-level device driver 720. The file system manager 710 utilizes a journaling approach to manage changes in directory or file organization, and also implements a write cache per file. The block-level device driver 720 maintains a per-block-device write cache.

Several kinds of updates to file systems, including for example changes to directory hierarchies, addition and deletion of files, and so on, often require modifications at underlying data structures maintained by file system managers. For example, when a file is deleted, in at least some operating systems, a directory entry has to be deleted, and space for the file and its node may have to marked "free" in a free space map. If a power failure or other crash occurs before all the required data structure modifications are completed, the data structures may become corrupted or inconsistent (e.g., storage leaks may result, or user data may get overwritten). To reduce the probability of such problems, some file system managers allocate a special area called a "journal" into which impending changes to the file system metadata are recorded ahead of time. If a crash occurs at such a file system, recovery may be accomplished by reading the journal from the file system and replaying changes until the file system is consistent again. In the depicted embodiment, the file system manager 710 may store the file system metadata journal 725 in the non-volatile portion of system memory 162 instead of, for example, on disk. Such an approach may substantially increase the speed at which journal entries can be written (which may in turn help overall file system performance under normal operating conditions) and may also help speed up recovery operations after crashes.

In at least some embodiments, the file system manager 710 may also use the non-volatile system memory to store metadata related to file write caches, as well as the data written to the files. Thus, in FIG. 7, for at least some of the files 722 (e.g., files 722A and 722B) of the file system, a corresponding write cache 724 (e.g., write cache 724A for file 722A and write cache 724B for file 722B) may be established in the NVSM 162. Data, store initially in the write caches in response to client write requests, may be copied to a backing store (e.g., at a disk) asynchronously with respect to the client write requests in the depicted embodiment. For at least some write caches 724, space within non-volatile system memory may be allocated for cache metadata 727 (e.g., metadata indicating the number of entries present, modification timestamps, the states of the entries such as "dirty" (not-yet written to disk) or "clean") as well as the written data 726. Thus, for file 722A, data 726A and cache metadata 727A may be stored in NVSM 162, while for file 722B, data 726B and cache metadata 727B may be stored in NVSM 162. In some embodiments NVSM may also be used for write caches that are shared by multiple files.

A similar approach with respect to write caches may be taken by various device drivers in some embodiments, including for example the block-level device driver 720 in FIG. 7. The block-level device driver 720 may create and manage various volumes 762, such as volumes 762A and 762B. For at least some of the volumes, a respective write cache 764 may be established in non-volatile system memory, comprising a data area 766 and a metadata area 767. Thus, for volume 762A in the depicted embodiment, write cache 764A comprising data 766A and metadata 767A may be set up, while for volume 762B, write cache 764B comprising data area 766B and metadata area 767B may be established. In some embodiments NVSM may also be used for write caches that are shared by multiple block devices.

Upon restart subsequent to a failure that causes loss of data from volatile portions of the system memory, the metadata and data stored in NVSM by the operating system components 702 may be read in rapidly for recovery. It is noted that only a subset of the metadata maintained by the operating system components may be stored in non-volatile system memory in at least some embodiments. Even with respect to per-file write caches and/or per-volume write caches, in some embodiments NVSM 162 may only be used for some selected files or for some selected volumes. Any of a number of criteria may be used by the operating system components in deciding which subset of metadata should be placed in non-volatile memory, including for example the identities of the clients on whose behalf the files or volumes were created, indications that some files/volumes have a higher performance requirement than others, and so on. It is also noted that with respect to file systems, in at least some embodiments either the journal metadata or the per-file write caches may be stored in NVSM, i.e., there is no requirement that journal contents and per-file write caches both be stored in NVSM. In some cases, for example, per-file write caching or journaling may not be implemented. In different embodiments, other operating system components than those shown in FIG. 7 may also utilize non-volatile system memory for storing important subsets of metadata.

Inter-Process Communication Using Non-Volatile System Memory

Figure 8:
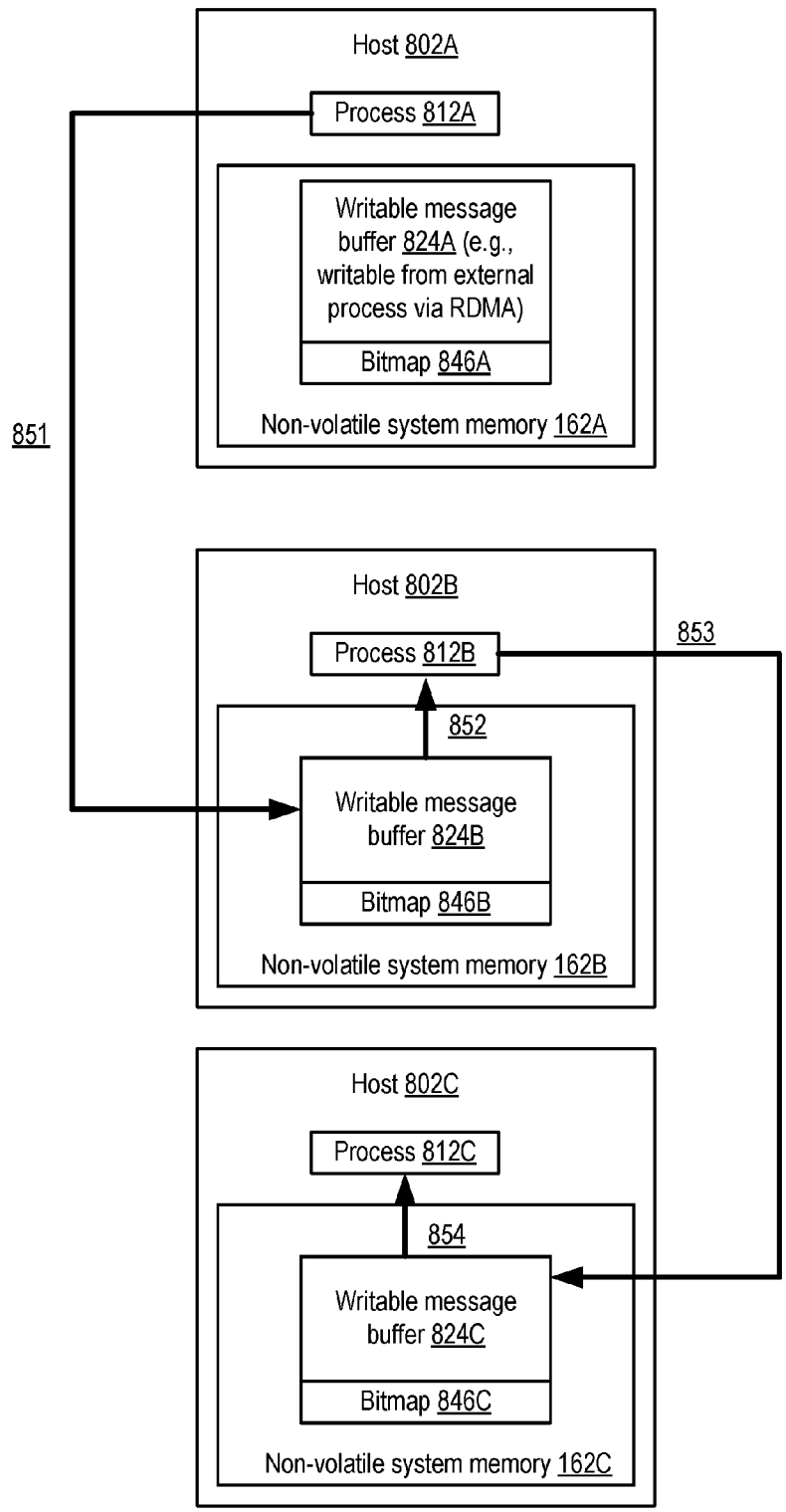
FIG. 8 illustrates an example of the use of non-volatile system memory for facilitating an inter-process communication mechanism, according to at least some embodiments.

FIG. 8 illustrates an example of the use of non-volatile system memory for facilitating an inter-process communication mechanism, according to at least some embodiments. A store-and-forward communication mechanism is illustrated, although the NVSM may be used for other kinds of protocols as well. In the depicted example, three processes 812A, 812B and 812C executing at respective hosts 802A, 802B and 802C are shown participating in a communication protocol that depends upon shared access to system memory by the participants. In some embodiments, instead of processes, other hardware or software modules or programs may participate in the protocol, e.g., the participants may each be a respective thread, or a hardware module. Each of the protocol participant processes 812 has selected an area of the non-volatile system memory as a message buffer to which one or more other participant processes are granted write permission. For example, writeable message buffer 824A has been established in NVSM 162A of host 802A for incoming messages directed at process 812A, writeable buffer 824B has been established in NVSM 162B of host 802B for incoming messages directed at process 812B, and writeable buffer 824C has been established in NVSM 162C of host 802C for incoming messages directed at process 812C. In some implementations, the writeable buffers may each comprise a plurality of message slots, with one slot being used for each message. The hosts 802A, 802B and 802C may be linked to each other via one or more network links in the depicted embodiment. In some embodiments, a remote direct memory access (RDMA) protocol may be used.

In at least some embodiments, the sender or source of a message may write the contents of the message to the target buffer asynchronously with respect to the reading of the message by the receiver or destination. For example, as soon as process 812A completes writing a message directed at process 812B into buffer 824B (with the successful return code from the write serving as an acknowledgement, or with an explicit write acknowledgement being received from host 802B), as indicated by arrow 851, process 812A may proceed on to other tasks. In some embodiments, the message buffers 824 may be configured as queues, such as first-in-first-out (FIFO) queues. At some later point in time, the intended destination process 812B may read the contents of the message (as indicated by arrow 852) and take corresponding responsive actions. The responsive actions may include, for example, forwarding at least a portion of the message on to message buffer 824C at host 802C (as indicated by arrow 853), with process 812C as the intended recipient (as indicated by arrow 854). The forwarding approach may be repeated at each sender process along a chain of senders in the depicted embodiment, until the message has reached its final intended destination. A given process 812 may serve as a sender module for some messages, and a receiver module for other messages.

In at least some embodiments, a read-completion indicator may be implemented in the NVSM corresponding to one or more of the receiver processes. Such an indicator may be used by a receiver to signal to the sender that one or more messages have been read by the receiver, and that the corresponding buffer space is therefor available for writing additional messages. In the depicted embodiment, respective bitmaps 846 (e.g., bitmap 846A in NVSM 162A, bitmap 846B in NVSM 162B, and bitmap 846C in NVSM 162C) may be configured as read-completion indicators, with one bit in the bitmap being used for each message slot. For example, in one implementation, a "1" may be written to a bit B1 corresponding to a message slot S1 by the sender when it writes a new message, and a "0" in bit B1 may indicate that S1's current contents have been read by a receiver. Data structures other than bitmaps may be used in some embodiments as read-completion indicators.

The use of non-volatile system memory for the message buffers may significantly improve the write latencies and the overall reliability of the messaging system, especially when compared to implementations that employ disk based message buffers. If a power failure or system crash occurs at host 802B subsequent to a message being written to buffer 824B by process 812A, the sender and the recipient may both be able to rely on the fact that the message will not be lost as a result of the failure. A number of different types of applications may use NVSM-based shared memory communication techniques in different embodiments, including for example DNS (Domain Name System) server applications, directory lookup servers such as LDAP (Lightweight Directory Access Protocol) servers, ActiveDirectory servers, and the like. NVSM buffers may also be used for inter-process communication within the same host in at least some embodiments—i.e., the sender and receiver need not necessarily be incorporated at different hosts. In at least some embodiments, the message buffers may be memory mapped into the application address space, in a manner similar to that described in conjunction with FIG. 4. In some embodiments, an explicit write acknowledgement may be sent to the sender indicating that the message contents have successfully been written at the target message buffer. In one such embodiment, the protocol may require that write acknowledgements be provided within a time window, and the use of NVSM may help meet the time window requirements. To prevent possible overwriting of the messages upon restart after a failure, in at least some embodiments the portion of the NVSM being used for the message buffers 824 may be write-protected for some period of time, e.g., until one or more stages of recovery are declared complete.

Logging Using Non-Volatile System Memory

Figure 9:
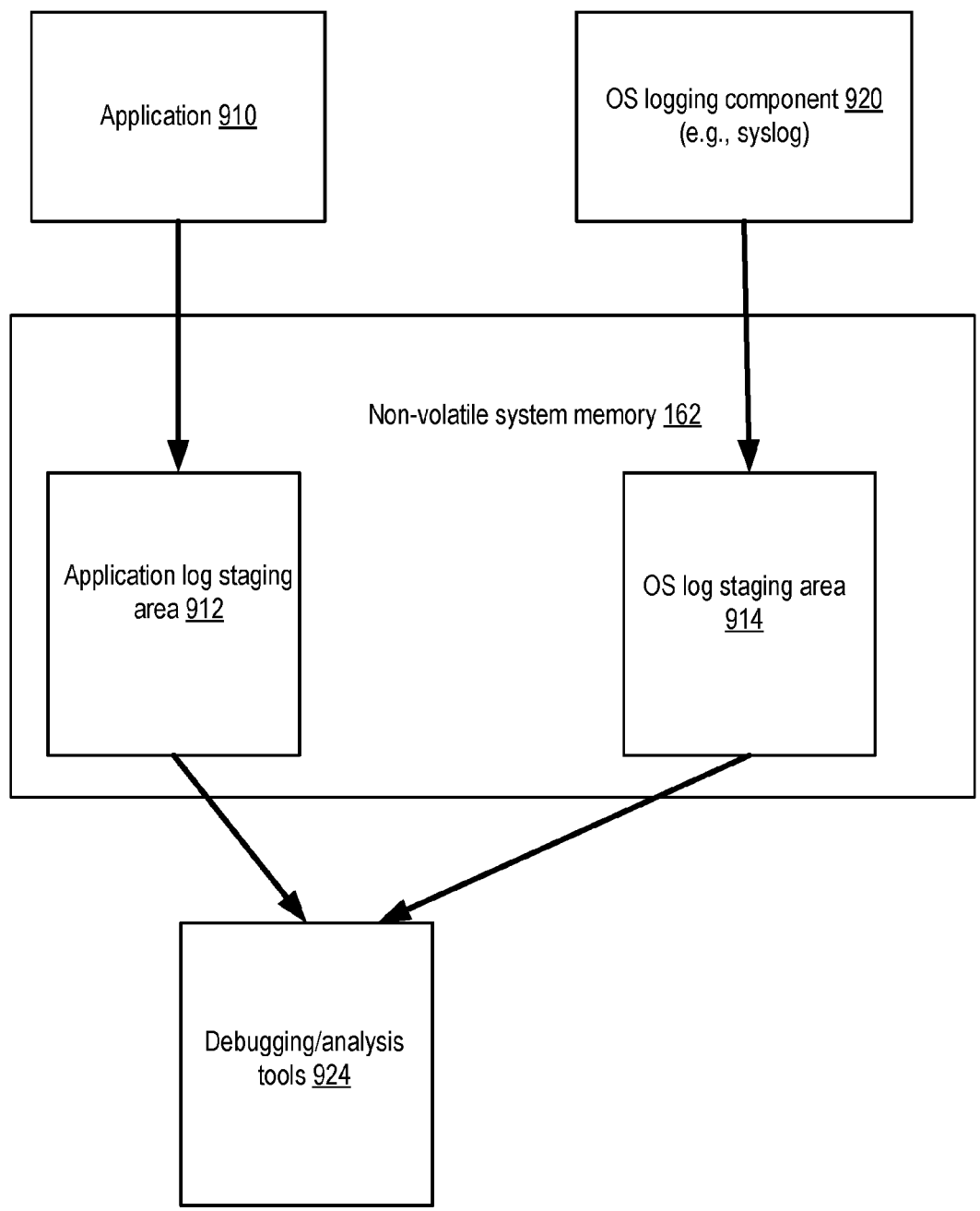
FIG. 9 illustrates an example of the use of non-volatile system memory for improving the effectiveness of logging techniques, according to at least some embodiments.

FIG. 9 illustrates an example of the use of non-volatile system memory for improving the effectiveness of logging techniques, according to at least some embodiments. Debugging system crashes or process crashes is often challenging. Even in environments in which substantial effort has been expended to insert logging calls into appropriate parts of the source code, the most interesting subset of log records (the ones generated immediately before the crash, for example) can be lost if they have not yet been written to persistent storage when the crash occurs. By utilizing the non-volatile portion of system memory for storing at least a subset of the logging output, such problems may be alleviated in at least some embodiments.

Either user-mode applications 910, or kernel-mode operating system logging components 920 (such as various syslog processes), or both, may utilize staging areas in the non-volatile portions of system memory 162 in various embodiments. The log records may first be written to the staging area, such as the application log staging area 912 or the operating system log staging area 914, and then at least some of the log records may be written to a different backing store, e.g., a backing store implemented using disk-based storage. In the event of a system crash or unexpected process exit, which may result in a loss of data stored in volatile portion of system memory, the most recent log records may be retained in the staging area(s). Such records, including any that may not have been persisted to the backing store prior to the failure, may be obtained from the staging areas for debugging analysis subsequently (e.g., upon restart in the case of a system crash). In some implementations the debugging/analysis tools 924 may be able to examine the log records while the application remains down.

Staging areas 912 and/or 914 may also be used for performance analysis in at least some embodiments. Debugging performance problems, especially in production environments, is often complicated by the fact that instrumentation (such as application trace messages) intended to help analyze the performance tends to add its own performance overhead, thereby potentially obscuring the root causes of the original problems. Using non-volatile system memory for performance-related logging may minimize the instrumentation overhead, helping to resolve performance problems more quickly.

The staging areas 912 and/or 914 may be configured as circular buffers in some embodiments. In various embodiments, not all log records generated by an application 910 or an operating system logging component 920 may be written to the staging areas. Instead, based on some combination of criteria, only some subset of key records may be written to the staging areas. Such criteria may include, for example, log levels (e.g., ERROR versus INFO versus DEBUG log levels) indicated for the different log records in the source code of application 910 or operating system component 920, the source code modules (e.g., methods or functions) at which the log records originate, current operating conditions (e.g., in one scenario, log records may be written to the staging area in NVSM if the utilization level of some resources crosses a threshold), or in response to explicit requests indicating durability requirements of the log records (e.g., from a watchdog process or monitor that can dynamically decide whether some types of log records are to be prioritized over others). In some implementations, memory mapping may be used to enable faster access to the staging areas from user-mode application code.

According to at least some embodiments, the size of the staging area to be established for a given application or operating system component may be tunable or configurable, e.g., based on an indication of a desired debugging time window for the application. For an application A1, for example, storing ten minutes' worth of debugging information in NVSM may be appropriate, while for another application A2, five minutes of debug records may be considered sufficient. An estimate of the number of log records expected to be generated per unit time, and the average size of a log record, may be used in combination with the time window to determine the size of the staging area. In some embodiments the log records generated by an application or an OS component may be written only to NVSM, and may not need to be written to a backing store.

Methods for Utilizing Non-Volatile System Memory

Figure 10:
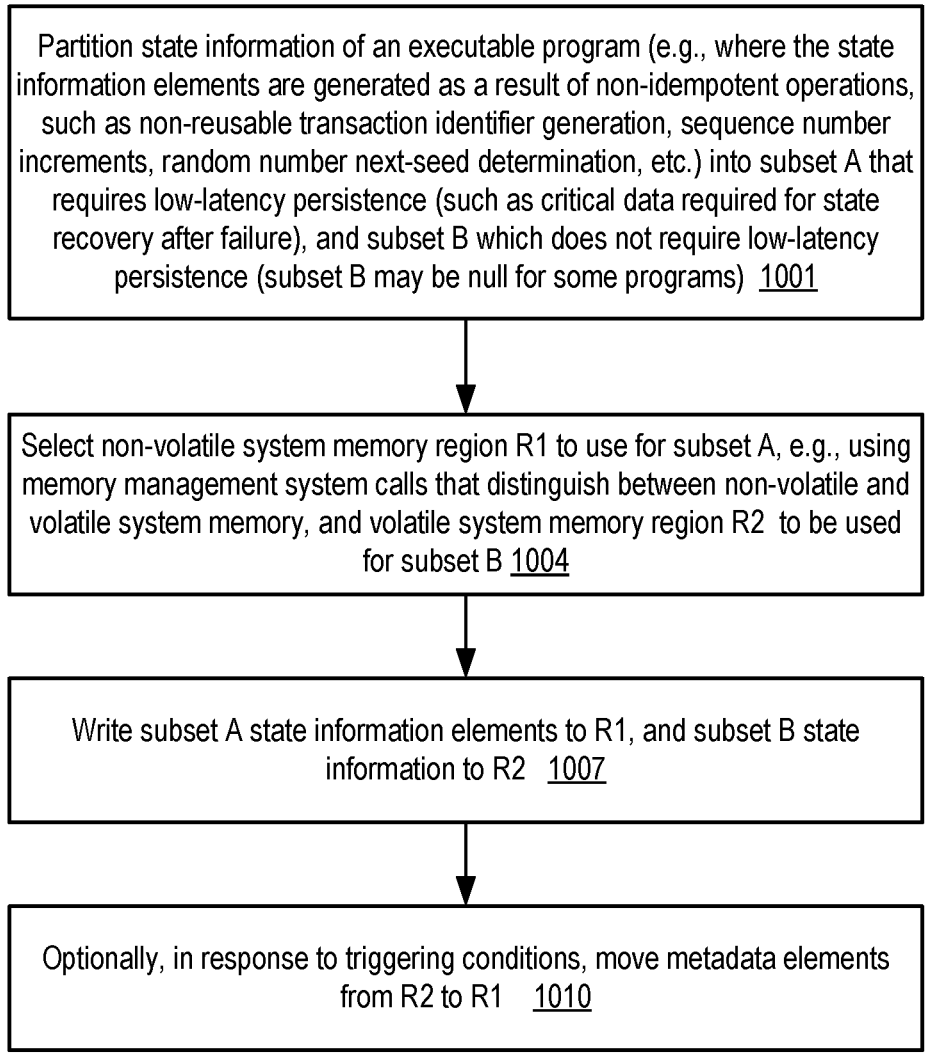
FIG. 10 is a flow diagram illustrating aspects of operations that may be performed using non-volatile system memory to save state information associated with non-idempotent operations, according to at least some embodiments.

FIG. 10 is a flow diagram illustrating aspects of operations that may be performed using non-volatile system memory to save state information associated with non-idempotent operations, according to at least some embodiments. As shown in element 1001, state information associated with a program may be partitioned into two subsets. Subset A may comprise critical state information elements required for recovery from failures, or at least for the early stages of a recovery from a failure, and may thus be appropriate for storing in a low-latency persistent storage area such as non-volatile system memory. Subset B may comprise less critical data that is not required for at least the early stages of recovery, or may not be required for recovery at all. (It is noted that at least in some embodiments, subset B may be empty; that is, all the state information may be needed for recovery.) At least some of the state information of subset A may have been generated as a result of non-idempotent operations, i.e., operations that may have some unwanted or negative effects if repeated. Examples of the kinds of state information that may be included in subset A were illustrated in FIG. 6b and may include sequence numbers, internal state information of random number generators, transaction identifiers for e-commerce transactions, workflow state records, and the like. In some implementations, the executable program (which may comprise an application running in user mode, for example, or an operating system component running in kernel mode) may invoke one or more APIs to indicate the critical elements of state information.

As shown in element 1004, a particular portion R1 of the system memory, comprising a non-volatile memory module of the one or more non-volatile memory modules, may be selected as the low-latency persistent data storage site to be used for the one or more elements of state information. Such a selection may be performed in some implementations by a memory management component of the operating system, in response to one or more system calls, e.g., memory allocation system calls that have parameters allowing the invoker to indicate whether non-volatile or volatile system memory is to be used. A region R2 in volatile memory may be designated for storing state information of subset B.

When an event that changes a state information element of subset A occurs, e.g., when one of the non-idempotent operations that result in state changes at the executable program occurs or when other state saving criteria are met, one or more of the elements of state information of subset A may be written to the R1 (element 1007). Similarly, whenever state information of subset B changes, it may be written to region R2 The non-idempotent operations or events may include, for example, a completion of a workflow transition (which may result in a workflow record being generated), a request for a new sequence number, an issuance of a transaction identifier, or a generation of a new random number or non-reusable number. In at least some embodiments, as indicated in element 1010, one or more other types of other triggering events or state-saving criteria may also or instead lead to the saving of the critical state information to R2, i.e., to the low-latency persistent storage implemented using non-volatile system memory. For example, in one embodiment it may be the case that at least a portion of state information is initially written to R2, and is moved or copied to R1 every N milliseconds or seconds (e.g., regardless of whether a non-idempotent operation occurred in the interim or not), in response to a request from a monitoring or watchdog application, or in response to a request from the executable program itself (e.g., the executable program or the monitoring application may invoke a "flush_state_to_nonvolatile_memory" API). Saving the critical state information to the nonvolatile portion of system memory may overwrite the previous version of the state information. In at least some embodiments, the low-latency persistent storage site for critical state information may be organized as a buffer or write cache with a backing store (e.g., a disk-based device) to which the state information is eventually expected to be written. In such embodiments, if the NVSM buffer happens to be full, a replacement policy established for the buffer (e.g., a least-recently-used (LRU) policy) may be used to decide which element or elements of the buffer are to be overwritten. In at least some embodiments, memory-mapped files or devices may be used for the state information of subset A. In some embodiments, state information may be moved back to volatile system memory from non-volatile system memory under some conditions (e.g., if R2 is full and additional high-priority state information is generated, lower-priority state information may be copied to R2 to free space in R1 for the new high-priority state information.)

Figure 11:
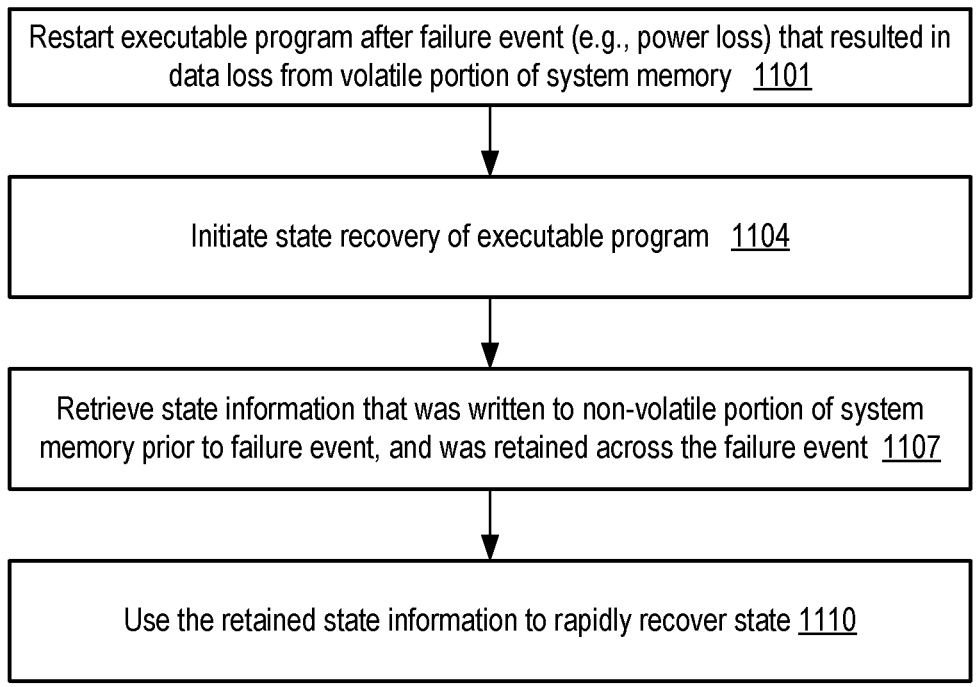
FIG. 11 is a flow diagram illustrating aspects of operations that may be performed using non-volatile system memory to recover application state subsequent to a failure, according to at least some embodiments.

FIG. 11 is a flow diagram illustrating aspects of operations that may be performed using non-volatile system memory to recover application state subsequent to a failure, according to at least some embodiments. As shown in element 1101, subsequent to a failure event (such as a power loss or a system crash for non-power related reasons) that caused a loss of data stored in the volatile portion of system memory, the executable program may be restarted. A state recovery procedure may then be initiated (element 1104), e.g., after a determination is made that the executable program did not exit cleanly or safely.

The state information that was written to the non-volatile portion of system memory, and hence remained unaffected by the failure event, may then be retrieved (element 1107). It is noted that at least in some embodiments, writes to the non-volatile portion of system memory, or the part of it used for saving critical state information, may be prevented temporarily to enable recovery to be completed successfully. In various implementations, write access to all or part of the NVSM may be disabled, using any appropriate hardware or software mechanism, until at least some phases of recovery are complete. Because of the low latency of access to the non-volatile system memory, recovery may be completed fairly rapidly in at least some embodiments (element 1110). In those embodiments in which write access to at least a portion of the NVSM was disabled, write access may be enabled after the corresponding phases of recovery are completed.

Figure 12:
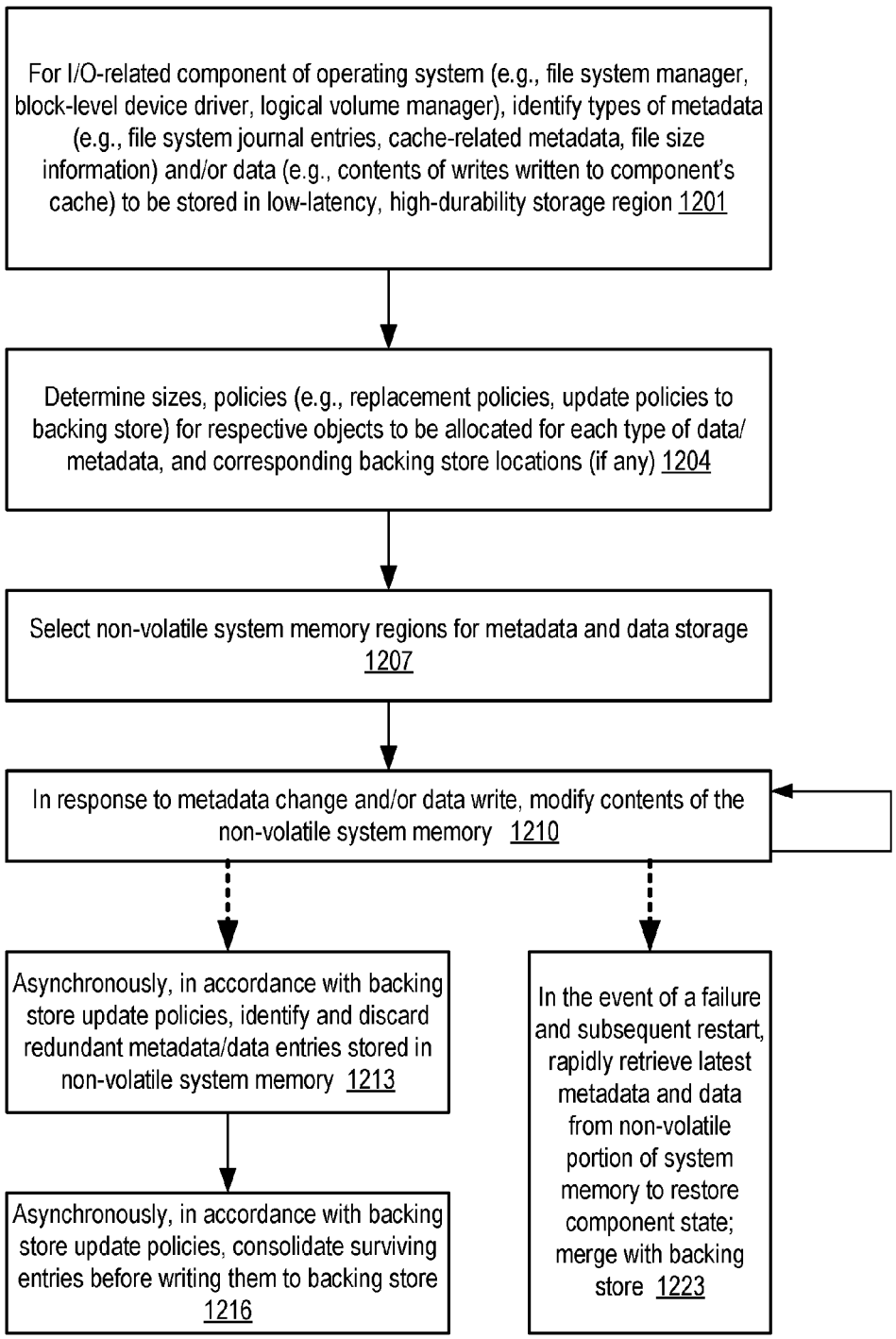
FIG. 12 is a flow diagram illustrating aspects of operations that may be performed to improve operating system metadata management using non-volatile system memory, according to at least some embodiments.

FIG. 12 is a flow diagram illustrating aspects of operations that may be performed to improve operating system metadata management using non-volatile system memory, according to at least some embodiments. As shown in element 1201, for one or more I/O-related components of an operating system, at least a selected subset of metadata and/or data to be stored within a low-latency high-durability data storage region may be identified. In various embodiments, such operating system components may include, for example, a file system manager, a block-level device driver, or a logical volume manager. The selected metadata may include such entities as file system metadata journal entries, such as entries that record changes to directory structure, removals or additions of files, and so on. In some implementations, the operating system component may implement write and/or read caches, such as per-file write caches or per-block-device write caches. The cache metadata for at least some types of caches, and/or the cache in the case of write caches (e.g., pointers to free entries, "dirty" versus "clean" indicators for cache entries, entry modification times, and so on), may be included in the information to be stored in the low-latency high-durability data storage region in some such implementations.

The sizes of the corresponding objects to be allocated from non-volatile system memory for the various metadata and data elements may be determined (element 1204). In at least some embodiments, a backing store on a different persistent storage device (e.g., a disk-based device such as a disk array, appliance, or at an individual disk) may be configured for at least some of the metadata and/or data. In some such embodiments, replacement policies (e.g., the rules that determine which entries from the NVSM are to be selected for replacement if the NVSM space allocated becomes full) and/or update policies (e.g., the triggering conditions that lead to writing a metadata or data entry from the NVSM to the backing store) may be determined.

A portion of the NVSM may be selected for storing the selected metadata and/or data entries of the operating system components (element 1207). Such a selection may result, for example, from an invocation of one or more memory-management related internal operating system interfaces (e.g., interfaces 311 of FIG. 3), or from an invocation of one or more system calls in some embodiments. In response to an operation that results in a metadata change (or a change to the contents of a write cache), the modified metadata and/or data may be stored at the NVSM (element 1210). The operations of writing newly modified metadata and/or data may be repeated over time, as indicated by the arrow leading from element 1210 back to element 1210.

In the event of a failure and subsequent restart of the operating system, the stored metadata and/or data may be quickly retrieved from the NVSM to restore the state of the operating system component(s) (element 1223). In addition, during or after restoration, the metadata and/or data that was stored in the NVSM but had not yet reached the backing store prior to the failure may be merged with the backing store, i.e., the backing store may be brought up to date. As discussed earlier, in at least some implementations write access to the NVSM may be temporarily disabled while the operating system components recover. In some embodiments in which backing stores are employed, the metadata and/or data stored in the NVSM may be analyzed prior to writing to the backing store in an effort to reduce and/or consolidate writes to the backing store. For example, as indicated in element 1213, redundant metadata entries (e.g., a metadata entry hat has been rendered superfluous by one or more other metadata entries) may be identified, and such entries may be discarded instead of writing them to the backing store in at least some embodiments. In some embodiments, the non-redundant entries may be consolidated (e.g., several such entries may be combined into a single write operation) prior to writing them to the backing store (element 1216). It is noted that both the redundancy analysis and the consolidation may be asynchronous with respect to the writing of the entries into the NVSM.

Figure 13:
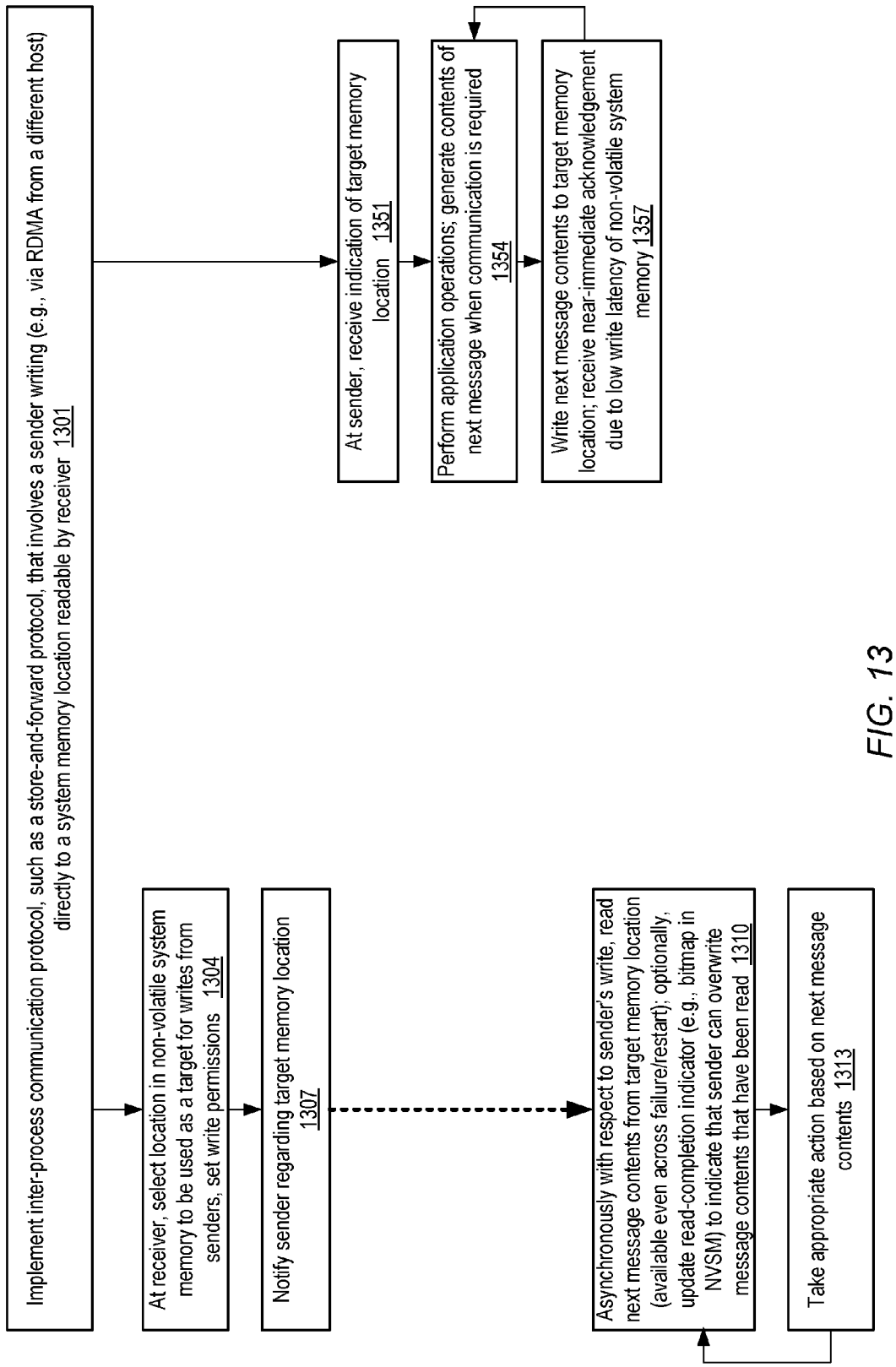
FIG. 13 is a flow diagram illustrating aspects of operations that may be performed to implement reliable inter-process communication using non-volatile system memory, according to at least some embodiments.

FIG. 13 is a flow diagram illustrating aspects of operations that may be performed to implement reliable inter-process communication using non-volatile system memory, according to at least some embodiments. As shown in element 1301, a shared-memory based inter-process communication protocol (such as any of various types of store-and-forward protocols) may be implemented, in accordance with which a source or sender program is expected to write message contents directly into the system memory of the receiver. A remote direct memory access (RDMA) protocol may be implemented in some embodiments.

Operations that may be performed at the receiving or destination side of a given set of messages are shown towards the left in FIG. 13, while operations at the sending side are shown towards the right. It is noted that in many cases, a given participant process in the protocol may be both a sender and a receiver for respective sets of messages, so that the same process may implement both types of operations. In various embodiments, the sender and recipient of a given message or data item may be executing at the same host, or at different hosts linked by a network path (i.e., the message may be transmitted over one or more network links to the target location at the receiver).

At the receiving side, as shown in element 1304, a target location for writes originating at the sender may be selected within non-volatile system memory, and write permission to the target location may be set accordingly. In some implementations, the target may comprise a memory-mapped location within the receiver process address space. The sending side may be notified regarding the target location (element 1307). At the sending side, the target location information may be received (element 1351), and, depending on the nature of the application, some non-messaging related operations may be performed before the data item(s) that form the contents of the next message are generated (element 1354). The message contents may be written to the target location (element 1357), and other application tasks may then be performed until another message is generated (as indicated by the arrow back to element 1354 from element 1357). In one embodiment, an explicit acknowledgement of the write may be sent to the message sender, and the read by the receiver may be asynchronous with respect to the acknowledgement. Because low-latency system memory is being used for the target location, the write may complete and/or be acknowledged very quickly, enabling the rapid resumption of the application tasks. The time window between the generation of the message contents, and the completion (or acknowledgement) of the write, which may be considered a window of vulnerability with respect to failure, may be shortened substantially as a result of the use of the NVSM for the target location, especially when contrasted to the use of disk-based devices.

Asynchronously with respect to the sender's write, the receiver may read the contents of the message (element 1310), and perform one or more actions in response (element 1313). In at least some embodiments, the receiver may update a read-completed indicator corresponding to the message (e.g., by writing to an appropriate bitmap 846 or other similar data structure in the NVSM of the receiver), so that the sender can safely overwrite the message contents if needed. Because the target location was in a non-volatile portion of system memory, the message contents may be readable even if a power failure or other event that causes loss of data stored in volatile system memory occurs between the write completion and the read. This process of asynchronously reading the data items written to the target location may be repeated over time, as indicated by the arrow leading from element 1313 back to element 1310. Depending on the nature of the communication protocol in use, in some embodiments, upon restart after failure, write access may be disabled to the target location until the receiving side has read the contents of the target location, or has had the opportunity to read the contents. In some embodiments, the actions taken by the receiver may involve transmitting at least a portion of the message contents, or a different message generated based on the received message, to a different destination in accordance with a store-and-forward protocol.

Figure 14:
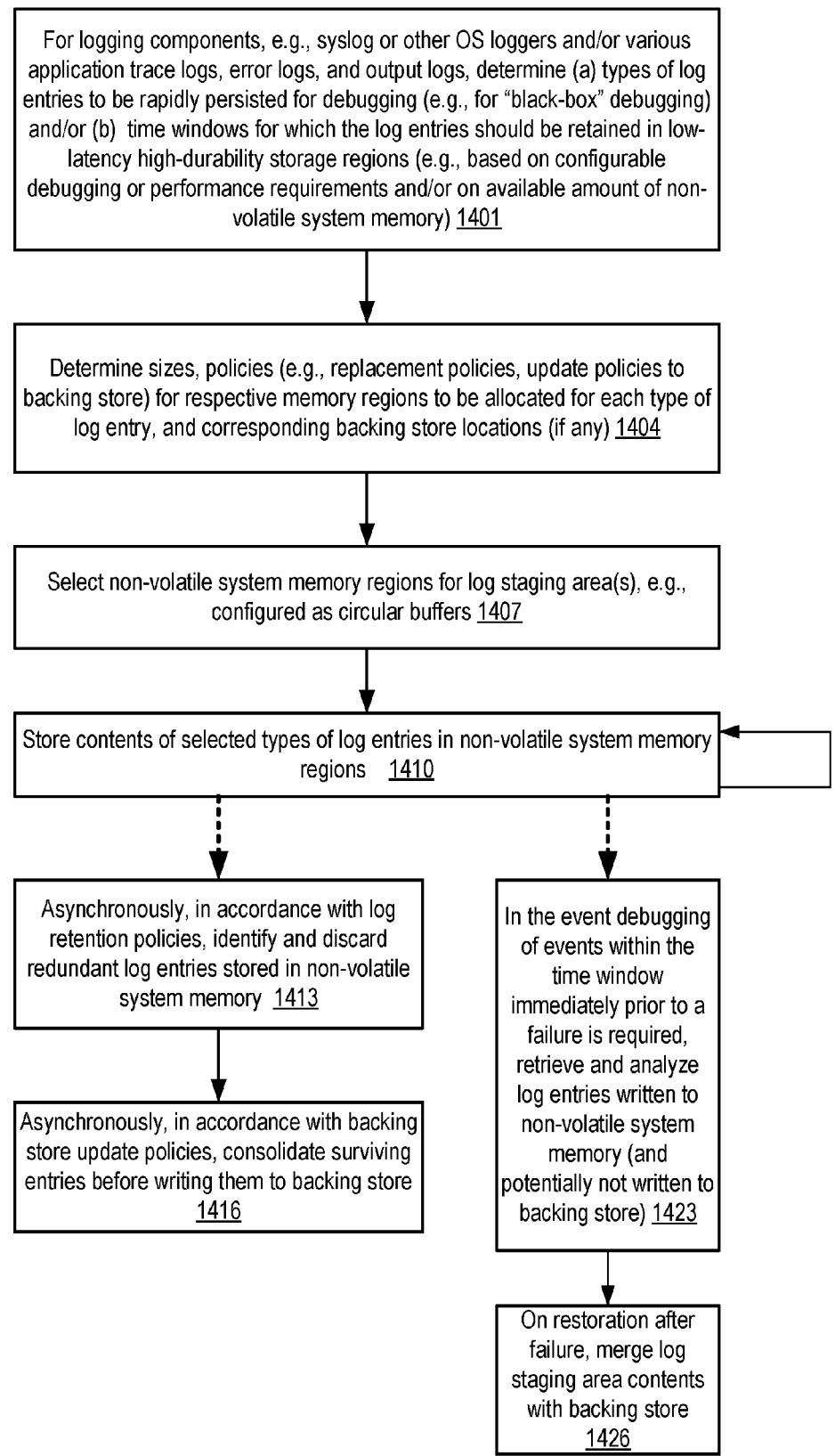
FIG. 14 is a flow diagram illustrating aspects of operations that may be performed to utilize non-volatile system memory for enhanced logging, according to at least some embodiments.

FIG. 14 is a flow diagram illustrating aspects of operations that may be performed to utilize non-volatile system memory for enhanced logging, according to at least some embodiments. A number of entities that may produce log records or trace records, including for example operating system components such as syslog, as well as user-mode applications, may be configured to use NVSM as a low-latency, high durability log staging area or buffer in different embodiments. A log staging area may also be referred to as a log persistence area herein. As shown in element 1401, several parameters governing the use of NVSM for logging may be determined, including for example (a) the types of log entries or records to be rapidly persisted for debugging and/or (b) time windows for which those types of log entries should be retained in the buffers. A number of different factors may be taken into consideration when determining the types of entries and the time windows in different embodiments, including for example the log levels associated with the log records, debugging requirements (e.g., what kinds of information is most useful for debugging targeted types of bugs), performance requirements (e.g., how low the logging overhead needs to be for the application or operating system component of interest), and/or on available amount of non-volatile system memory. In some implementations the particular source code components from which the log records are generated may be used as criteria for selecting log entries for NVSM staging. In at least one embodiment, decisions regarding which types of log records are to be granted higher priority may be made dynamically, e.g., based on a request from a monitoring program that indicates a changed durability requirement for some set of log entries, and/or on metrics of operating conditions such as current resource utilization levels at the systems where the log records are generated or at other related systems.

In at least some embodiments, a backing store may be configured for the log records, e.g., on disk or other types of persistent storage in a different layer of the storage hierarchy. The sizes of the log staging areas to be allocated from non-volatile system memory, and the policies to be used to manage the staging areas, such as replacement and flushing policies, may be determined (element 1404) in the depicted embodiment. Regions of the appropriate sizes may be allocated from the NVSM (element 1407), e.g., using various types of system calls or internal operating system interfaces. In some implementations, memory mapping interfaces may be used. In some embodiments, a circular buffer configuration may be used, in which the oldest entries are selected for replacement by newer entries. The contents of the selected types of logging records resulting from various application and/or operating system events may be stored in the NVSM regions (element 1410) on an ongoing basis (as indicated by the arrow from element 1410 back to element 1410).

Subsequent to a crash or other failure event that results in a loss of data in volatile portions of system memory, debugging of events that occurred in a time window immediately before the failure may be desired. Log records that were written to the staging area(s), but had not yet been placed in the backing store may remain accessible after the failure, and may be accessed from the NVSM (element 1423). During or after restoration, the contents of the staging areas may be merged with the backing store (element 1426).

In at least some embodiments, log records in the staging area(s) may be analyzed for redundancy and/or relevance prior to being written to the backing store in accordance with the applicable log retention policies, and redundant or irrelevant log entries may be discarded (element 1413). The retention policies may, for example, indicate minimum times for which log records of various types have to be stored in the NVSM and/or in the backing store, as well as criteria to be used to determine whether a given log record is no longer required. In some embodiments, the log records or entries that do have to be written to the backing store may be compacted or consolidated in various ways, e.g., to reduce the number of writes that have to be performed to the backing store (element 1416).

It is noted that in various embodiments, operations other than those illustrated in the flow diagrams of FIGS. 10, 11, 12, 13 and 14 may be implemented to support various techniques using non-volatile system memory components, and that some of the operations shown may not be implemented, or may be implemented in a different order or in parallel rather than sequentially.

Use Cases

The techniques described above, of configuring hybrid system memory that includes both volatile and non-volatile memory modules, and of exploiting the non-volatile portions for enhancing various aspects of application and operating system operations, may be beneficial in a variety of scenarios. Several types of applications that may be enhanced using NVSM have been discussed above, such as messaging applications, directory services, DNS services, workflow applications, cryptographic/security applications, protocols that rely on non-reuse of data or on sequence numbers or random numbers, and the like. In addition, some cloud service providers may decide to establish new categories of compute servers equipped with hybrid memory at their data centers, and may be able to command higher prices for compute instances launched on servers with greater amounts of non-volatile system memory available. Clients of the network-accessible services supported may be able to weigh the costs and benefits of using hybrid-memory servers for different applications.

Illustrative Computer System

Figure 15:
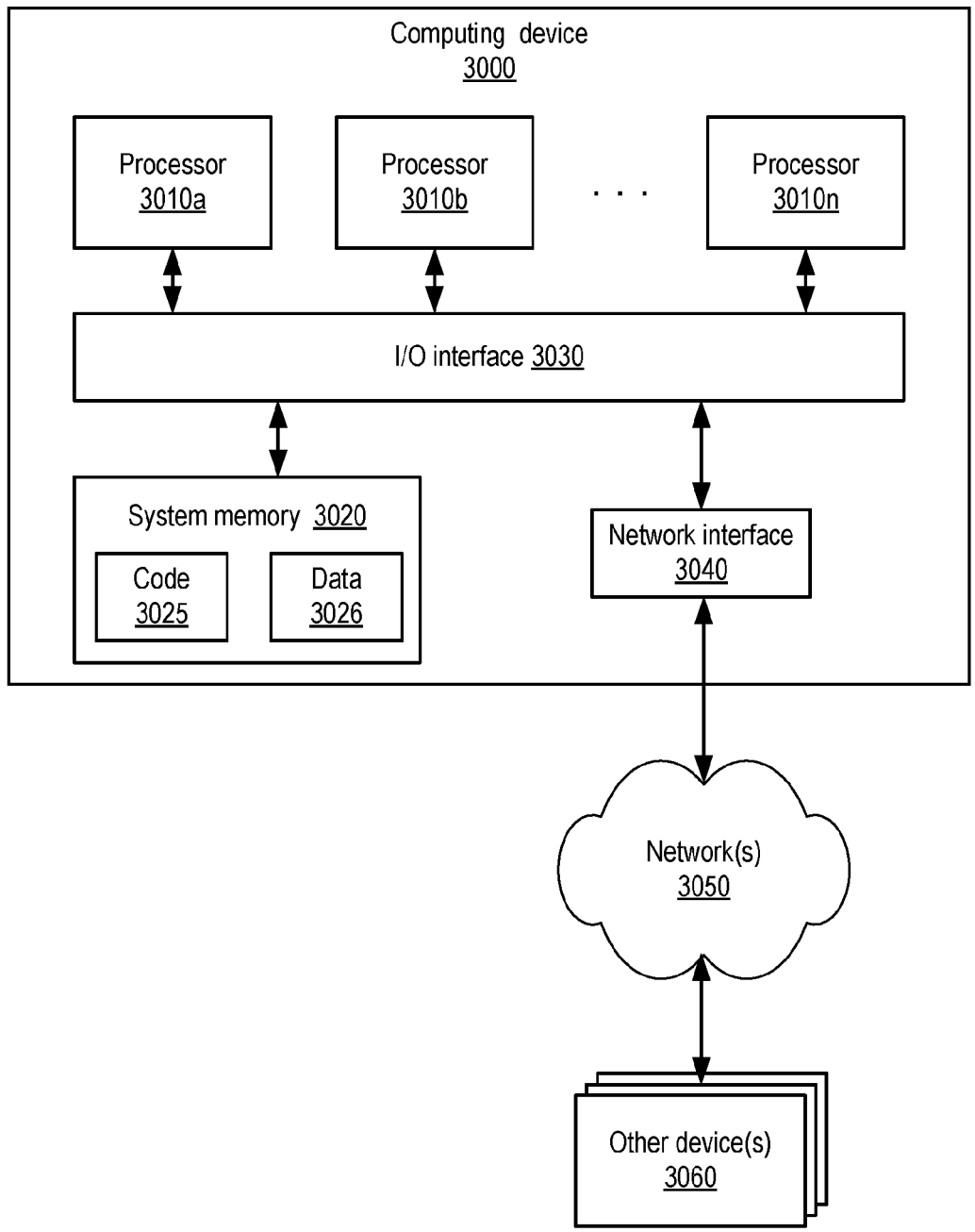
FIG. 15 is a block diagram illustrating an example computing device that may be used in at least some embodiments.

In at least some embodiments, a server that implements a portion or all of one or more of the technologies described herein, including the various techniques to utilize non-volatile system memory to improve recovery times, enhance performance during normal operating conditions, implement efficient distributed messaging techniques, and enhanced logging, may include a general-purpose computer system that includes or is configured to access one or more computer-accessible media. FIG. 15 illustrates such a general-purpose computing device 3000. In the illustrated embodiment, computing device 3000 includes one or more processors 3010 coupled to a system memory 3020 (which may comprise both non-volatile and volatile memory modules) via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. In some implementations, graphics processing units (GPUs) may be used instead of, or in addition to, conventional processors.

System memory 3020 may be configured to store instructions and data accessible by processor(s) 3010. In various embodiments, the volatile portion of system memory 3020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, racetrack memory, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 14, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 14 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 15 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    a persistent storage device;
    a system memory having a lower access latency than the persistent storage device, wherein the system memory is linked to one or more processors and comprises non-volatile memory and volatile memory, wherein the system memory stores program instructions that when executed on the one or more processors:
        provide an interface for a source program or a destination program to request via an operating system whether a target location is to be memory mapped in a volatile memory space mapped to the volatile memory or to a non-volatile memory space mapped to the non-volatile memory;
        cause the operating system to map the target location into the requested memory space;
        perform a write from the source program of a data item to the target location mapped to the non-volatile memory; and
        provide, subsequent to a failure event that results in a loss of data stored in the volatile memory, access to the data item to be read from the target location by the destination program.

2. The system recited in claim 1, wherein the system memory stores program instructions that when executed on the one or more processors:
    read, by the destination program from the particular target location, subsequent to the failure event that results in the loss of data stored in the volatile memory, the data item written by the source program at the particular target location prior to the failure event.

3. The system recited in claim 1, wherein the non-volatile memory of the system memory comprises a non-volatile dual inline memory module (NV-DIMM).

4. The system recited in claim 1, wherein the source program is executed at a different computing device than the destination program, and wherein the source program transmits the data item to the particular target location via a network link.

5. The system recited in claim 1, wherein the interface for the source program or the destination program to request whether the target location is to be memory mapped in the volatile memory space mapped to the volatile memory or to the non-volatile memory space mapped to the non-volatile memory comprises an RDMA (remote direct memory access) protocol.

6. The system recited in claim 1, wherein the interface for the source program or the destination program to request whether the target location is to be memory mapped in the volatile memory space mapped to the volatile memory or to the non-volatile memory space mapped to the non-volatile memory comprises a store-and-forward messaging protocol, and wherein the destination program is further configured to transmit at least a portion of the data item to a different destination program.

7. A method comprising:
    performing, by one or more computing devices comprising one or more respective persistent storage devices and one or more respective processors linked to a respective system memory comprising one or more non-volatile memory modules and one or more volatile memory modules, the system memory having a lower access latency than the respective persistent storage device:
        providing an interface for a source program or a destination program to request via an operating system whether a target location is to be memory mapped in a volatile memory space mapped to the volatile memory or to a non-volatile memory space mapped to the non-volatile memory;
        causing the operating system to map the target location into the requested memory space;
        performing a write from the source program of a data item to the target location mapped to the non-volatile memory; and
        providing, subsequent to a failure event that results in a loss of data stored in the volatile memory, access to the data item to be read from the target location by the destination program.

8. The method recited in claim 7,
    wherein the system memory is part of a particular computing device of the one or more computing devices, and the sender module is executed at a different computing device than the particular computing device;
    the method further comprising receiving, by the one or more computing devices, the data item at the particular computing device over a network link from the different computing device.

9. The method recited in claim 7,
    wherein the interface for the source program or the destination program to request whether the target location is to be memory mapped in the volatile memory space mapped to the volatile memory or to the nonvolatile memory space mapped to the non-volatile memory comprises a store-and-forward messaging protocol;

the method further comprising:
reading, by the destination program in accordance with the store-and-forward messaging protocol, subsequent to the failure event that results in the loss of data stored in the volatile portion of the system memory, the data item written by the source program at the particular location in accordance with the store-and-forward messaging protocol prior to the failure event; and transmitting, by the destination program, the data item to a different destination.

10. The method recited in claim 7,
wherein the destination program comprises an application running in user mode;
the method further comprising generating, at the one or more computing devices in response to a system call, a memory map of a subset of the non-volatile memory within an address space of the application.

11. The method recited in claim 7, further comprising:
performing, by the destination program, one or more operations based at least in part on contents of the data item; and
providing a write acknowledgement to the source program, wherein said performing the one or more operations is asynchronous with respect to said providing the write acknowledgment.

12. The method recited in claim 7, further comprising:
setting, by the destination program, a read-complete indicator in the non-volatile memory to indicate to the source program that at least a portion of the target location is available for writing a different data item.

13. The method recited in claim 7, further comprising:
disabling, subsequent to the failure event, write access to at least a sub-portion of the non-volatile memory until the data item has been read by the destination program.

14. A non-transitory computer readable storage medium storing program instructions that execute on one or more computing devices comprising one or more processors that are linked to system memory, the system memory comprising one or more non-volatile memory modules and one or more volatile memory modules, the system memory having a lower access latency than a persistent storage device of the system, wherein the program instructions execute on the one or more computing devices to:
provide an interface for a source program or a destination program to request via an operating system whether a target location is to be memory mapped in a volatile memory space mapped to the volatile memory or to a non-volatile memory space mapped to the non-volatile memory;
cause the operating system to map the target location into the requested memory space;
perform a write from the source program of a data item to the target location mapped to the non-volatile memory; and provide, subsequent to a failure event that results in a loss of data stored in the volatile memory, access to the data item to be read from the target location by the destination program.

15. The non-transitory computer readable storage medium of claim 14, wherein the interface provided for the source program or the destination program to request whether the target location is to be memory mapped in the volatile memory space mapped to the volatile memory or to the non-volatile memory space mapped to the non-volatile memory comprises an RDMA (remote direct memory access) protocol.

16. The non-transitory computer readable storage medium of claim 14,
wherein the interface provided for the source program or the destination program to request whether the target location is to be memory mapped in the volatile memory space mapped to the volatile memory or to the non-volatile memory space mapped to the non-volatile memory comprises a store-and-forward messaging protocol, and
wherein the program instructions further execute on the one or more computing devices to cause the destination program to perform one or more operations based at least in part on contents of the data item, the one or more operations comprising transmit the data item to a different destination.

17. The non-transitory computer readable storage medium of claim 14, wherein the destination program comprises a component of one of: (a) a Domain Name System (DNS) service, or (b) a directory service.

18. The non-transitory computer readable storage medium of claim 14, wherein the program instructions execute on the one or more computing devices to:
perform, by the destination program, one or more operations based at least in part on contents of the data item; and
provide a write acknowledgement to the source program, wherein said perform the one or more operations is asynchronous with respect to said provide the write acknowledgment.

19. The non-transitory computer readable storage medium of claim 14, wherein the program instructions execute on the one or more computing devices to:
set, by the destination program, a read-complete indicator in the non-volatile memory to indicate to the source program that at least a portion of the target location is available for writing a different data item.

20. The non-transitory computer readable storage medium of claim 14, wherein the program instructions execute on the one or more computing devices to disable, subsequent to the failure event, write access to at least a sub-portion of the non-volatile memory until the data item has been read by the destination program.

* * * * *